United States Patent
Thach et al.

(10) Patent No.: US 8,949,019 B2
(45) Date of Patent: Feb. 3, 2015

(54) COMMUNICATION DEVICE, MOBILE TERMINAL, MEDIUM, INFORMATION GENERATION METHOD, AND SYSTEM

(75) Inventors: David Thach, Kawasaki (JP); Atsushi Ike, Kawasaki (JP); Yutaka Tamiya, Kawasaki (JP); Ryosuke Oishi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 255 days.

(21) Appl. No.: 13/556,285

(22) Filed: Jul. 24, 2012

(65) Prior Publication Data

US 2013/0060459 A1 Mar. 7, 2013

(30) Foreign Application Priority Data

Sep. 2, 2011 (JP) ................................. 2011-192104

(51) Int. Cl.
*H04L 12/28* (2006.01)
*G01C 21/34* (2006.01)
(52) U.S. Cl.
CPC .................................. *G01C 21/3423* (2013.01)
USPC ........................................................ 701/400
(58) Field of Classification Search
None
See application file for complete search history.

(56) References Cited

U.S. PATENT DOCUMENTS

| 8,073,446 | B2 | 12/2011 | Ishii et al. | |
|---|---|---|---|---|
| 8,214,139 | B2 * | 7/2012 | Yonker et al. | 701/470 |
| 8,228,234 | B2 * | 7/2012 | Paulson et al. | 342/451 |
| 8,332,140 | B2 * | 12/2012 | de Silva et al. | 701/412 |
| 2010/0146076 | A1 * | 6/2010 | Adriazola et al. | 709/219 |
| 2012/0315960 | A1 * | 12/2012 | Kim | 455/574 |
| 2012/0322387 | A1 * | 12/2012 | Nicoara et al. | 455/67.11 |
| 2013/0281154 | A1 * | 10/2013 | Aerrabotu | 455/553.1 |
| 2013/0331091 | A1 * | 12/2013 | Chang et al. | 455/423 |
| 2014/0045535 | A1 * | 2/2014 | Dai et al. | 455/456.3 |

FOREIGN PATENT DOCUMENTS

| JP | 2006-129019 | 5/2006 |
|---|---|---|
| JP | 2006-197536 | 7/2006 |
| JP | 2007-187620 | 7/2007 |
| JP | 2008-153773 | 7/2008 |
| JP | 2008-529443 | 7/2008 |
| JP | 2008-275544 | 11/2008 |
| WO | WO-2006/093392 | 9/2006 |

* cited by examiner

*Primary Examiner* — John R Olszewski
*Assistant Examiner* — James M McPherson
(74) *Attorney, Agent, or Firm* — Fujitsu Patent Center

(57) ABSTRACT

A communication device includes a memory and a processor coupled to the memory. The processor executes a process including calculating an amount of electricity available in a second device while a first communication unit and a second communication unit with each other, determining a first generation unit to be a generation unit, when the amount of electricity thus calculated is smaller than a predetermined amount, out of the first generation unit that generates navigation information based on information acquired by an information acquisition unit and a second generation unit, and controlling the second device so as to stop supplying power to the second generation unit and to output the navigation information generated by the first generation unit when the first generation unit is determined.

1 Claim, 21 Drawing Sheets

FIG.3

| ENTRY | SIM NUMBER | MAC ADDRESS | IP ADDRESS | MODEL INFORMATION |
|---|---|---|---|---|
| 1 | 820050000000134 | 3E:A9:10:00:6F:78 | 10.120.22.10 | F801i |
| 2 | 883200780060453 | F0:A4:DE:4C:11:03 | 10.120.22.11 | F803i |
| ⋮ | ⋮ | ⋮ | ⋮ | ⋮ |

FIG.4

| MODEL INFORMATION | CORRE- SPONDING OS | CORRESPONDING APPLICATION |
|---|---|---|
| F801i | OS1 | A1 |
| F803i | OS2 | A1, A2 |
| ⋮ | ⋮ | ⋮ |

FIG.5

| MODEL INFORMATION | POWER CONSUMPTION OF 3G TRANSCEIVER [W] | POWER CONSUMPTION OF Wi-fi TRANSCEIVER [W] | POWER CONSUMPTION OF GPS RECEIVER AND GPS SIGNAL PROCESSING ENGINE [W] | POWER CONSUMPTION OF NAVIGATION ENGINE [J/update] | POWER CONSUMPTION OF DISPLAY CONTROL DEVICE [J/update] | UPDATE FREQUENCY OF NAVIGATION SCREEN [update] |
|---|---|---|---|---|---|---|
| F801i | $P_{3G}$ | $P_{Wifi}$ | $P_{GPS}$ | $E_{Navi}$ | $E_{Disp}$ | $F_{Updt}$ |
| F802i | $P_{3G}$ | $P_{Wifi}$ | $P_{GPS}$ | $E_{Navi}$ | $E_{Disp}$ | $F_{Updt}$ |
| ... | ... | ... | ... | ... | ... | ... |

COMMUNICATION DEVICE, MOBILE TERMINAL, MEDIUM, INFORMATION GENERATION METHOD, AND SYSTEM

CROSS-REFERENCE TO RELATED APPLICATIONS

This application is based upon and claims the benefit of priority of the prior Japanese Patent Application No. 2011-192104, filed on Sep. 2, 2011, the entire contents of which are incorporated herein by reference.

FIELD

The embodiments discussed herein are directed to a communication device, a mobile terminal, an information generation program, an information generation method, and an information generation system.

BACKGROUND

In recent years, in the field of mobile terminals, mobile terminals have been designed to reduce power consumption thereof from the perspective of increasing lives of batteries. The power consumption when a mobile terminal is connected to the Internet varies depending on communication methods for connecting the mobile terminal to the Internet.

Examples of the communication methods include a communication method for accessing the Internet by a 3rd generation (3G) antenna used for communications with a 3G network, and a communication method for accessing the Internet by a wireless fidelity (Wi-Fi) antenna used for Wi-Fi communications. Between both communication methods, the mobile terminal employing the communication method for accessing the Internet by a Wi-Fi antenna consumes less power.

Therefore, when a mobile terminal is connected to the Internet, the power consumption of the mobile terminal can be reduced by employing Wi-Fi antennas as much as possible for connecting the mobile terminal to the Internet.

Conventionally, such technologies for reducing the power consumption include a technology in which an antenna that can communicate with the Wi-Fi antenna of a mobile terminal, that is, a so-called access point is prepared in a moving object, such as a vehicle, a train, and a ship.

Devices that generate navigation information such as a navigation screen using information including position information, map information, and traffic information have been developed. In the description below, "navigation" may be simply referred to as "navi". Such a device, for example, acquires each piece of the information including the position information, the map information, and the traffic information from another device, and generates the navigation information using each of the information thus acquired. At this time, the accuracy of each piece of the information including the position information, the map information, and the traffic information acquired from another device may be higher than that of each piece of the information including the position information, the map information, and the traffic information acquired by the device that generates the navigation information. In such a case, the device that generates the navigation information can generate navigation information with higher accuracy than that of the navigation information generated using each piece of the information including the position information, the map information, and the traffic information acquired by the device itself.

A device that searches a route to a destination and displays a route screen has been developed. When a user uses means of transportation, such as a train, along this route, for example, such a device turns OFF the power of a global positioning system (GPS) engine from a departure station to an arrival station.

Patent Document 1: Japanese National Publication of International Patent Application No. 2008-529443
Patent Document 2: Japanese Laid-open Patent Publication No. 2006-129019
Patent Document 3: Japanese Laid-open Patent Publication No. 2006-197536
Patent Document 4: Japanese Laid-open Patent Publication No. 2008-153773
Patent Document 5: Japanese Laid-open Patent Publication No. 2008-275544
Patent Document 6: Japanese Laid-open Patent Publication No. 2007-187620

However, there is a problem in that related technologies described above still fail to reduce the power consumption.

The problem will be explained using a specific example. For example, while the device that generates the navigation information is in operation, power is constantly supplied to a navigation module. As a result, the power consumption for the navigation module is not reduced. Therefore, the device that generates the navigation information described above fails to reduce the power consumption.

Furthermore, there is another problem in that, in the device that turns OFF the power of the GPS engine from a departure station to an arrival station, the navigation function is not available from the departure station to the arrival station.

SUMMARY

According to an aspect of the embodiments, a communication device includes a memory and a processor coupled to the memory. The processor executes a process including calculating an amount of electricity available in a second device different from a communication device while a first communication unit of the communication device that communicates with a second communication unit of the second device and the second communication unit are in a state capable of communicating with each other, determining a first generation unit to be a generation unit that generates navigation information to be output by the second device, when the amount of electricity thus calculated is smaller than a predetermined amount, out of the first generation unit that generates navigation information based on information acquired by an information acquisition unit that acquires information used to generate the navigation information and a second generation unit that is a second generation unit provided to the second device and that generates navigation information, and controlling the second device so as to stop supplying power to the second generation unit and to output the navigation information generated by the first generation unit when the first generation unit is determined.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 3 is a schematic of an example of a first table;

FIG. 4 is a schematic of an example of a database;

FIG. 5 is a schematic of an example of a second table;

DESCRIPTION OF EMBODIMENTS

Exemplary embodiments of a communication device, a mobile terminal, an storage medium, an information generation method, and an information generation system according to the embodiments are described below in greater detail with reference to the accompanying drawings. Note that the embodiments are not intended to limit the disclosed technology. The embodiments can be combined arbitrarily without being inconsistent with the processing content.

[a] First Embodiment

Figure 1:
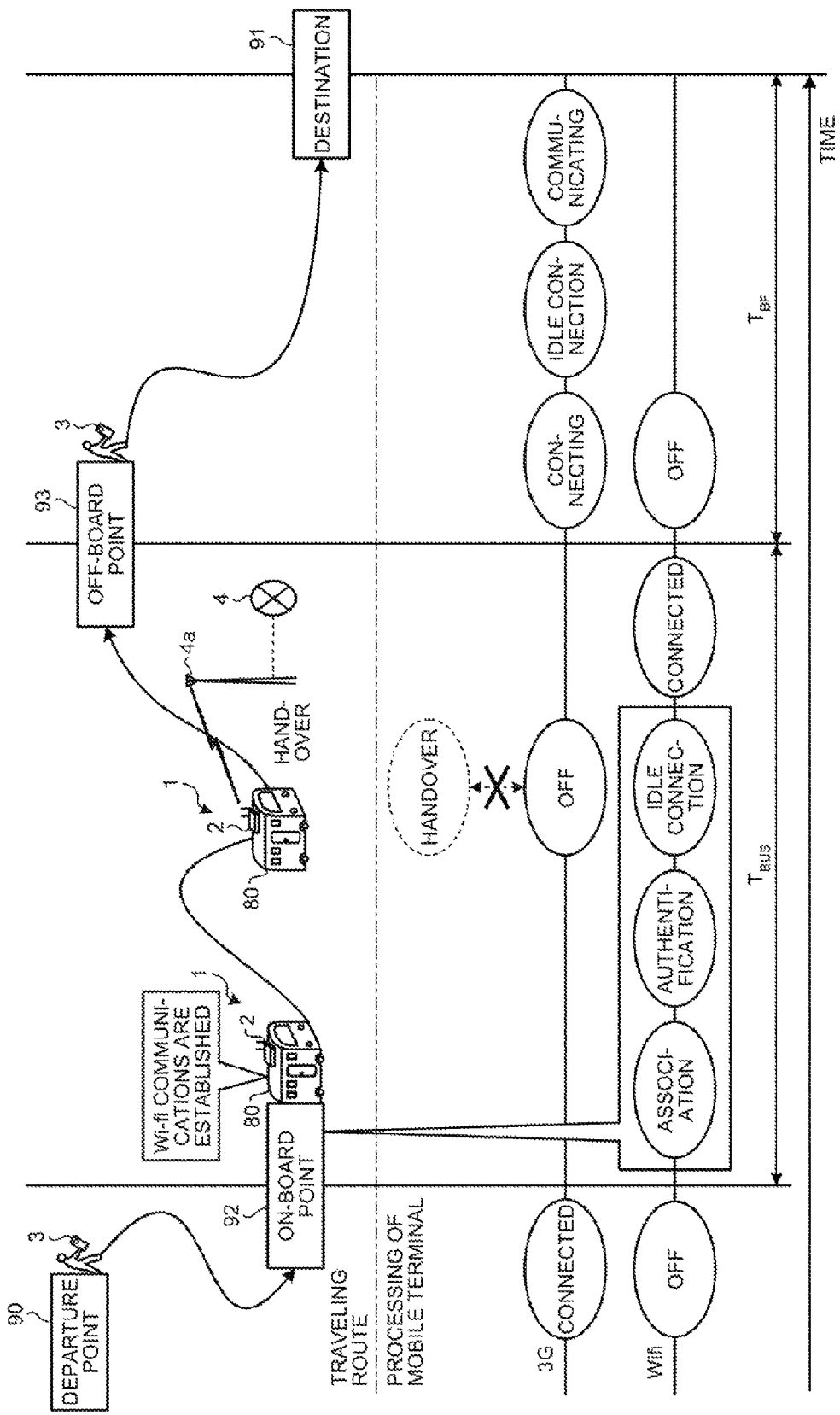
FIG. 1 is a schematic for illustrating a system according to a first embodiment.

A system according to a first embodiment will now be described. FIG. 1 is a schematic for illustrating the system according to the first embodiment. FIG. 1 illustrates an example in which a user of a mobile terminal 3 travels from a departure point 90 where the user starts to a destination 91 that is a destination point. In the example illustrated in FIG. 1, the user enters the destination to the mobile terminal 3 at the time of starting. The user then travels along a route from the departure point 90 to the destination 91 searched by a navigation function of the mobile terminal 3.

The mobile terminal 3 includes a global positioning system (GPS) signal receiver 3d, a GPS signal processing engine 3e, and a navigation engine 3f, which will be described later. When receiving the destination from the user, the mobile terminal 3 causes the GPS signal processing engine 3e to process a GPS signal received by the GPS signal receiver 3d. By the processing performed by the GPS signal processing engine, the position of the mobile terminal 3 is detected. The navigation engine 3f of the mobile terminal 3 uses position information indicating the position thus detected, map information, traffic information, and the destination to search a route. As a result, a display device 3p, which will be described later, of the mobile terminal 3 displays a navigation screen illustrating the route acquired as a result of the route search.

In the example illustrated in FIG. 1, the user takes a moving object 80 while traveling from the departure point 90 to the destination 91. FIG. 1 illustrates the example in which the user takes a bus as the moving object 80. In other words, in the example illustrated in FIG. 1, the user travels on foot from the departure point 90 to an on-board point 92, which is a point of a bus stop. In the example illustrated in FIG. 1, the user then gets on the moving object 80 at the on-board point 92. In the example illustrated in FIG. 1, the user then travels by the moving object 80 from the on-board point 92 to an off-board point 93, which is a point of a bus stop where the user gets off the moving object 80. Subsequently, in the example illustrated in FIG. 1, the user travels on foot from the off-board point 93 to the destination 91.

In the example illustrated in FIG. 1, the mobile terminal 3 is being connected to a 3G network 4 by a 3G transceiver 3a of the mobile terminal 3 while the user is traveling from the departure point 90 to the on-board point 92. In the example illustrated in FIG. 1, a Wi-Fi transceiver 3b, which will be described later, of the mobile terminal 3 is set incapable of communicating while the user is traveling from the departure point 90 to the on-board point 92. For example, the power of the Wi-Fi transceiver 3b is turned OFF while the user is traveling from the departure point 90 to the on-board point 92. Conventionally, power is consumed for scanning performed by a Wi-Fi transceiver of a mobile terminal between the departure point 90 and the on-board point 92. However, the mobile terminal 3 does not perform the scanning by the Wi-Fi transceiver 3b. Accordingly, with the mobile terminal 3, the power consumption can be reduced.

Subsequently, the mobile terminal 3 turns ON the power of the Wi-Fi transceiver 3b at the on-board point 92. The mobile terminal 3 then transmits a connection request including information used for association in the Wi-Fi communications to a communication device 2 in the moving object 80 by a radio frequency identification (RFID) transceiver 3c, which will be described later, at the on-board point 92, and associates the Wi-Fi transceiver 3b for the Wi-Fi communications between the communication device 2 and the mobile terminal 3. Subsequently, the mobile terminal 3 is authenticated by the communication device 2 to establish the Wi-Fi communications, and is in a state of idle connection. The connection request includes a media access control (MAC) address, a subscriber identity module (SIM), and model information of the mobile terminal 3.

Between the on-board point 92 and the off-board point 93, the mobile terminal 3 turns OFF the power of the 3G transceiver 3a to make the 3G transceiver 3a incapable of communicating. The mobile terminal 3 then accesses the Internet via the communication device 2 by the Wi-Fi transceiver 3b between the on-board point 92 and the off-board point 93. This makes the 3G transceiver 3a incapable of accessing the Internet and performing telephone conversations between the on-board point 92 and the off-board point 93. At this time, the communication device 2 performs a handover between the on-board point 92 and the off-board point 93 instead of the mobile terminal 3.

As a result, the mobile terminal 3 need not repeat the handover, thereby reducing the power consumption. Furthermore, in terms of a telephone conversation, the mobile terminal 3 can perform the telephone conversation via the communication device 2 by the Wi-Fi transceiver 3b. When a telephone conversation is performed between the on-board point 92 and the off-board point 93, the mobile terminal 3 may query the communication device 2 about base station information, and set the 3G transceiver to be capable of communicating, thereby achieving a high-quality telephone conversation.

At the on-board point 92, the communication device 2 calculates $E_{BUS}$ that is an amount of electricity available in the mobile terminal 3 between the on-board point 92 and the off-board point 93.

By contrast, at the on-board point 92, the communication device 2 calculates an amount of electricity $E_{st1}$ consumed in the mobile terminal 3 between the on-board point 92 and the off-board point 93 under the conditions described below. Specifically, the communication device 2 turns OFF the power of the GPS signal receiver 3d and the GPS signal processing engine 3e, and calculates the amount of electricity $E_{st1}$ consumed when the navigation engine 3f is caused to generate navigation information such as a navigation screen at the minimum frequency based on the position information, the map information, and the traffic information transmitted from the communication device 2.

The communication device 2 then compares the amount of electricity $E_{BUS}$ and the amount of electricity $E_{st1}$. In the case where the amount of electricity $E_{BUS}$ is larger than the amount of electricity $E_{st1}$, even if the power of the navigation engine 3f is turned ON between the on-board point 92 and the off-board point 93, the amount of electricity consumed $E_{st1}$ does not exceed the amount of electricity available $E_{BUS}$. Therefore, the communication device 2 determines the navigation engine 3f to be an engine that generates the navigation information.

By contrast, in the case where the amount of electricity $E_{BUS}$ is smaller than the amount of electricity $E_{st1}$, if the power of the navigation engine 3f is turned ON between the on-board point 92 and the off-board point 93, the amount of electricity consumed $E_{st1}$ exceeds the amount of electricity available $E_{BUS}$. Therefore, the communication device 2 determines a navigation engine 2f of the communication device 2 to be the engine that generates the navigation information. If the mobile terminal 3 includes no navigation engine, the communication device 2 can determine the navigation engine 2f to be the engine that generates the navigation information without comparing the amount of electricity $E_{BUS}$ and the amount of electricity $E_{st1}$. This allows a mobile terminal including no navigation engine to use the navigation function.

If the navigation engine 3f is determined to be the engine that generates the navigation information, the mobile terminal 3 performs the following processing: the mobile terminal 3 turns OFF the power of the GPS signal receiver 3d and the GPS signal processing engine 3e, and causes the navigation engine 3f to generate the navigation information based on the position information, the map information, and the traffic information transmitted from the communication device 2. Accordingly, with a system 1, it is possible to reduce the amount of electricity consumed in the GPS signal receiver 3d and the GPS signal processing engine 3e. Note that the system 1 is an example of the information generation system.

Furthermore, if the navigation engine 2f is determined to be the engine that generates the navigation information, the mobile terminal 3 performs the following processing: the mobile terminal 3 turns OFF the power of the GPS signal receiver 3d, the GPS signal processing engine 3e, and the navigation engine 3f, and receives the navigation information generated by the navigation engine 2f of the communication device 2 from the communication device 2. The mobile terminal 3 turns OFF the power of the GPS signal receiver 3d, the GPS signal processing engine 3e, an the navigation engine 3f, and receives the navigation information generated in the communication device 2 in this manner. Accordingly, with the system 1, it is possible to reduce the amount of electricity consumed in the GPS signal receiver 3d, the GPS signal processing engine 3e, and the navigation engine 3f.

When the user gets off the moving object 80, the mobile terminal 3 can query the communication device 2 about the base station information, turn ON the power of the 3G transceiver 3a, and reset the 3G transceiver 3a in a state capable of communicating. At the off-board point 93, the mobile terminal 3 turns OFF the power of the Wi-Fi transceiver 3b to cancel the connection with a Wi-Fi transceiver 2b, which will be described later, of the communication device 2. The mobile terminal 3 does not perform scanning by the Wi-Fi transceiver 3b between the off-board point 93 and the destination 91. The mobile terminal 3 is connected to a base station 4a by the 3G transceiver to be in the state of idle connection, and communicates with the 3G network 4. Furthermore, when the user gets off the moving object 80, the mobile terminal 3 turns ON the power of the GPS signal receiver 3d, the GPS signal processing engine 3e, and the navigation engine 3f, and outputs the navigation information.

Conventionally, power is consumed for scanning performed by a Wi-Fi transceiver of a mobile terminal between the off-board point 93 and the destination 91. As described above, however, the mobile terminal 3 does not perform the scanning by the Wi-Fi transceiver 3b. Accordingly, with the system 1, the power consumption can be reduced.

As described above, the mobile terminal 3 according to the present embodiment can reduce the power used for the scanning performed by the Wi-Fi transceiver 3b, and reduce the power used for the handover. Furthermore, with the system 1 according to the present embodiment, it is possible to keep a balance between the accuracy of the navigation and the amount of electricity consumed depending on the battery levels of the mobile terminal 3.

Figure 2:
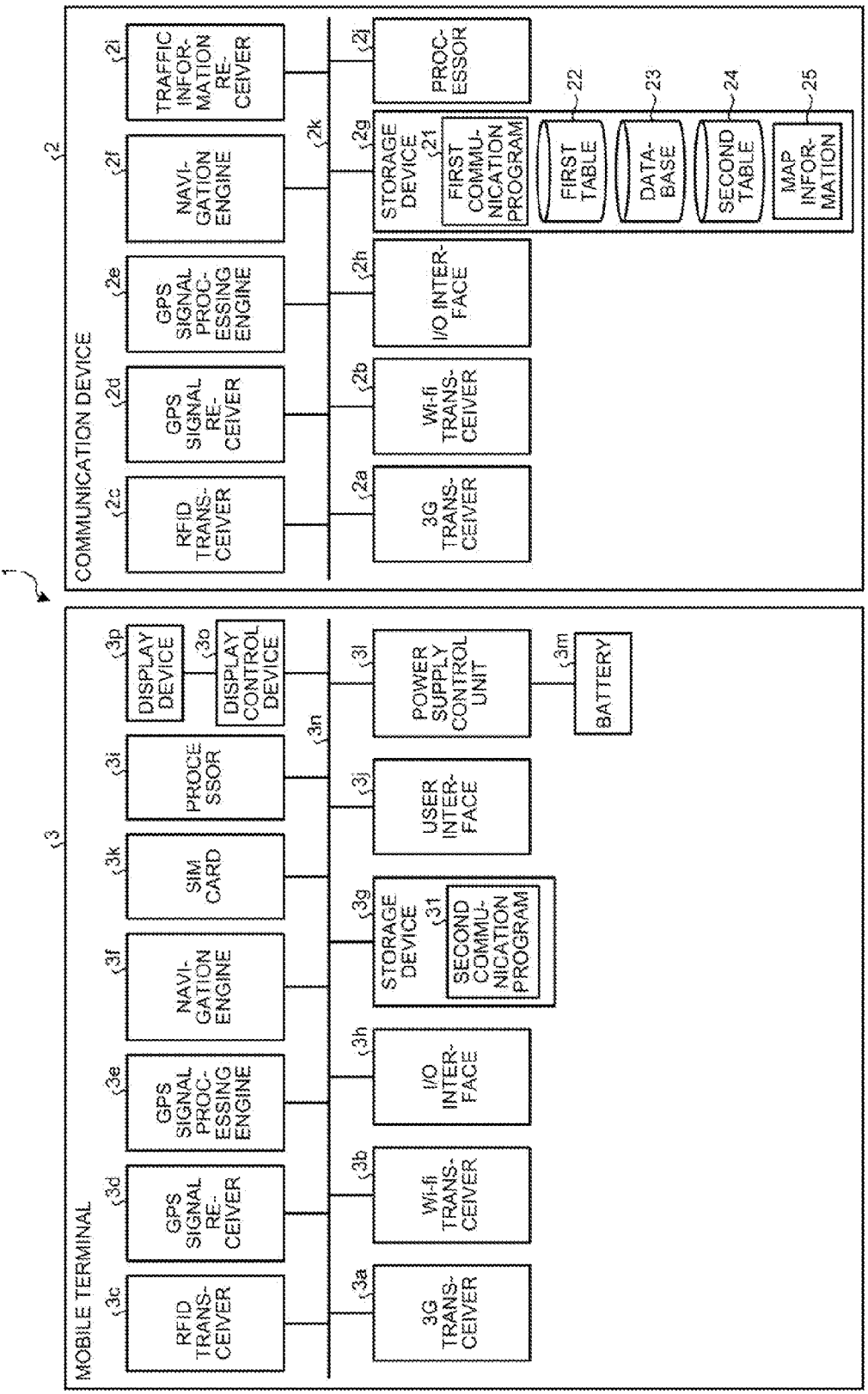
FIG. 2 is a diagram of an exemplary configuration of a communication system according to the first embodiment.

FIG. 2 is a diagram of an exemplary configuration of the communication system according to the first embodiment. As illustrated in FIG. 2, the system 1 includes the communication device 2 and the mobile terminal 3. The system 1 is a system established when communications between the communication device 2 and the mobile terminal 3 can be performed by Wi-Fi transceivers while the user carrying the mobile terminal 3 is on board the moving object 80 on which the communication device 2 is mounted.

The communication device 2 is an in-vehicle device mounted on the moving object 80. The communication device 2 includes a 3G transceiver 2a, the Wi-Fi transceiver 2b, an RFID transceiver 2c, a GPS signal receiver 2d, a GPS signal processing engine 2e, the navigation engine 2f, and a storage device 2g. The communication device 2 further includes an input/output (I/O) interface 2h, a traffic information receiver 2i, and a processor 2j. The 3G transceiver 2a, the Wi-Fi transceiver 2b, the RFID transceiver 2c, the GPS signal receiver 2d, the GPS signal processing engine 2e, the navigation engine 2f, the storage device 2g, the I/O interface 2h, and the traffic information receiver 2i are connected via a bus 2k. The processor 2j is connected to the bus 2k. Therefore, the equipment connected to the bus 2k can communicate with each other. Examples of the moving object 80 on which the communication device 2 is mounted include a bus, a vehicle, a motorcycle, a bicycle, a taxi, a train, a ship, and a plane. The communication device 2 is connected to a wireless communication network outside of the moving object 80. Furthermore, the communication device 2 is connected to the mobile terminal 3 in the moving object 80 with a wireless communication network in the moving object 80. The wireless communication network outside of the moving object 80 is hereinafter referred to as an "external wireless communication network", whereas the wireless communication network in the moving object 80 is referred to as an "internal wireless communication network".

Examples of the external wireless communication network include an external wireless communication network in which communications are performed by the 3 G communication method, such as wideband-code division multiple access (W-CDMA), CDMA 2000, and worldwide interoperability for microwave access (WiMAX). A mobile communication network in which communications are performed by a next-generation communication method posterior to the 3G communication method can be employed as the external wireless communication network. The external wireless communication network allows the mobile terminal 3 to perform both of telephone conversations and data communications. The present embodiment will be explained using a 3G network as an example of the external wireless communication network.

Examples of the internal wireless communication network include a wireless local area network (LAN) spot provided in the moving object. The internal wireless communication network is a network whose power consumption is lower than that of the external wireless communication network. The present embodiment will be explained using Wi-Fi as an example of the internal wireless communication network.

The 3G transceiver 2a communicates with the base station 4a of the 3G network 4, which will be described later, using a 3G antenna.

The Wi-Fi transceiver 2b performs Wi-Fi communications using a Wi-Fi antenna. The Wi-Fi transceiver 2b, for example, performs the Wi-Fi communications with the Wi-Fi transceiver 3b of the mobile terminal 3.

The RFID transceiver 2c performs communications using an RFID antenna. The RFID transceiver 2c, for example, communicates with the RFID transceiver 3c of the mobile terminal 3.

The GPS signal receiver 2d receives a GPS signal from a GPS satellite, and transmits the GPS signal to the GPS signal processing engine 2e. In the example illustrated in FIG. 1, because the power of the GPS signal receiver 2d is turned ON between the departure point 90 and the destination 91, the GPS signal receiver 2d performs the following processing: the GPS signal receiver 2d receives a GPS signal from a GPS satellite, and transmits the GPS signal to the GPS signal processing engine 2e.

The GPS signal processing engine 2e performs processing for detecting the position of the GPS signal processing engine 2e on the GPS signal transmitted from the GPS signal receiver 2d to detect the position, and generates the position information indicating the position. Because the GPS signal processing engine 2e is included in the communication device 2, the position of the GPS signal processing engine 2e can be considered as the position of the communication device 2. For example, in the example illustrated in FIG. 1, because the power of the GPS signal processing engine 2e is turned ON between the departure point 90 and the destination 91, the GPS signal processing engine 2e performs the following processing: the GPS signal processing engine 2e generates the position information indicating the position of the communication device 2 from the GPS signal. Furthermore, in the example illustrated in FIG. 1, the power of the GPS signal processing engine 2e is turned OFF between the on-board point 92 and the off-board point 93. As a result, power consumption is reduced in the GPS signal processing engine 2e.

The navigation engine 2f generates navigation information such as a navigation screen. Based on the destination, the map information, the position information, and the traffic information, for example, the navigation engine 2f searches a route from the position indicated by the position information to the destination. For example, in the example illustrated in FIG. 1, between the departure point 90 to the destination 91, the navigation engine 2f performs the following processing: based on the destination, map information 25, the traffic information received by the traffic information receiver 2i, and the position information generated by the GPS signal processing engine 2e, the navigation engine 2f searches a route from the position indicated by the position information to the destination. The navigation engine 2f then generates the navigation information such as a navigation screen on which the route obtained as a result of the route search is displayed at predetermined update frequency. Note that the navigation engine 2f is an example of a generation unit.

The storage device 2g stores therein a first information generation program 21, a first table 22, a database 23, a second table 24, and the map information 25.

The first information generation program 21 is a program for performing first information generation processing for controlling generation of the navigation information.

The mobile terminal 3 and the communication device 2 are connected to the first table 22. Every time the processor 2j generates a virtual terminal, which will be described later, a record in which information of the virtual terminal thus generated is registered is added to the first table 22. FIG. 3 is a schematic of an example of the first table. In the example illustrated in FIG. 3, the first table 22 includes a SIM number item, a MAC address item, an Internet protocol (IP) address item, and a model information item in a manner corresponding to each entry item.

The mobile terminal 3 and the communication device 2 are connected to the entry item, and the order of generating the virtual terminals in the communication device 2 is registered in the entry item. The order is also referred to as "entry". In other words, the entry is a number allocated to a virtual terminal uniquely.

In the SIM number item, a SIM number of the mobile terminal 3 is registered as a SIM number of the virtual terminal. In the MAC address item, a MAC address uniquely allocated to the mobile terminal 3 is registered as a MAC address of the virtual terminal. The MAC address is an address for identifying a source or a destination of data, and is a 48-bit code in the case of Ethernet (registered trademark). In the IP address item, an IP address allocated to the virtual terminal of the mobile terminal 3 by the communication device 2 is registered. In the model information item, model information for identifying a model of the mobile terminal 3 transmitted from the mobile terminal 3 to the communication device 2 is registered as model information of the virtual terminal. Examples of the model information include the name of a manufacturer of the mobile terminal 3, and a code for specifying the name of the model.

In the example illustrated in FIG. 3, the first record indicates that the SIM number of the virtual terminal whose order of being generated is "1" is "820050000000134". In the example illustrated in FIG. 3, the first record indicates that the MAC address of the virtual terminal whose order of being generated is "1" is "3E:A9:10:00:6 F:78". In the example illustrated in FIG. 3, the first record indicates that the IP address of the virtual terminal whose order of being generated is "1" is "10.120.22.10". In the example illustrated in FIG. 3, the first record indicates that the model information of the virtual terminal whose order of being generated is "1" is "F801i".

In the database 23, information indicating an operating system (OS) and an application used in the mobile terminal 3 is registered for each model of the mobile terminal 3 identified by the model information. FIG. 4 is a schematic of an example of the database. In the example illustrated in FIG. 4, the database 23 includes a corresponding OS item and a corresponding application item in a manner corresponding to each model information item.

In the model information item, the model information of the mobile terminal 3 is registered. In the corresponding OS item, information indicating an OS used in the mobile terminal 3 identified by each piece of the model information is registered. In the corresponding application item, information indicating an application used in the mobile terminal 3 identified by each piece of the model information is registered. At this time, the OS indicated by the information registered in the corresponding OS item is stored in the storage device 2g. Therefore, based on the information registered in the corresponding OS item, the OS indicated by the information can be acquired from the storage device 2g. Similarly, the application indicated by the information registered in the corresponding application item is stored in the storage device 2g. Therefore, based on the information registered in the corresponding application item, the application indicated by the information can be acquired from the storage device 2g.

In the example illustrated in FIG. 4, the first record indicates that the OS used in the mobile terminal 3 identified by the model information "F801i" is "OS1", and that the application used therein is "A1".

In the second table 24, information related to the amount of electricity to be consumed is registered for each model of the mobile terminal 3 identified by the model information. FIG. 5 is a schematic of an example of the second table. In the example illustrated in FIG. 5, the records of the second table 24 include a model information item, a power consumption item of the 3G transceiver, a power consumption item of the Wi-Fi transceiver, and a power consumption item of the GPS signal receiver and the GPS signal processing engine. In addition, in the example illustrated in FIG. 5, the records of the second table 24 include a power consumption item of the navigation engine, a power consumption item of a display control device, and an update frequency item of the navigation screen.

In the model information item, the model information of the mobile terminal 3 is registered. In the power consumption item of the 3G transceiver, an amount of electricity [w] consumed in the 3G transceiver 3a of the mobile terminal 3 identified by each piece of the model information is registered. In the power consumption item of the Wi-Fi transceiver, an amount of electricity [w] consumed in the Wi-Fi transceiver 3b of the mobile terminal 3 identified by each piece of the model information is registered. In the power consumption item of the GPS signal receiver and the GPS signal processing engine, an amount of electricity [w] consumed in the GPS signal receiver 3d and the GPS signal processing engine 3e of the mobile terminal 3 identified by each piece of the model information is registered. In the power consumption item of the navigation engine, an amount of electricity [J/update] consumed every time the navigation engine 3f of the mobile terminal 3 identified by each piece of the model information generates the navigation information is registered. In the power consumption item of the display control device, an amount of electricity [J/update] consumed every time a display control device 3o of the mobile terminal 3 identified by each piece of the model information displays the navigation screen, which is an example of the navigation information, is registered. In the update frequency item of the navigation screen, the number of times [update] per unit time to update the navigation screen is registered. Examples of the number of times include the number of times specified by developers who develop the mobile terminal 3 in the development stage of the mobile terminal 3.

In the example illustrated in FIG. 5, the first record indicates that the amount of electricity consumed in the 3G transceiver 3a of the mobile terminal 3 identified by the model information "F801i" is "$P_{3G}$". In the example illustrated in FIG. 5, the first record indicates that the amount of electricity consumed in the Wi-Fi transceiver 3b of the mobile terminal 3 identified by the model information "F801i" is "$P_{Wifi}$". In the example illustrated in FIG. 5, the first record indicates that the amount of electricity consumed in the GPS signal receiver 3d and the GPS signal processing engine 3e of the mobile terminal 3 identified by the model information "F801i" is "$P_{GPS}$". In the example illustrated in FIG. 5, the first record indicates that the amount of electricity consumed every time the navigation engine 3f of the mobile terminal 3 identified by the model information "F801i" generates a navigation screen is "$E_{Navi}$". In the example illustrated in FIG. 5, the first record indicates that the amount of electricity consumed every time the display control device 3o of the mobile terminal 3 identified by the model information "F801i" displays the navigation screen is "$E_{Disp}$". In the example illustrated in FIG. 5, the first record indicates that the number of times per unit time to update the navigation screen of the mobile terminal 3 identified by the model information "F801i" is "$F_{Updt}$".

The map information 25 is information including positions and names of roads, facilities, and the like. The map information 25 is used for generating the navigation information or the like.

The I/O interface 2h is connected to an external device, and controls input and output of data to and from the external device. For the I/O interface 2h, a serial port, or a universal serial bus (USB) port can be used, for example.

The traffic information receiver 2i receives traffic information such as vehicle information and communication system (VICS) information from a beacon station arranged on a road. The traffic information receiver 2i can receive FM multiplex broadcasting indicating traffic road conditions of broader area than that of the traffic information received from the beacon station.

Figure 6:
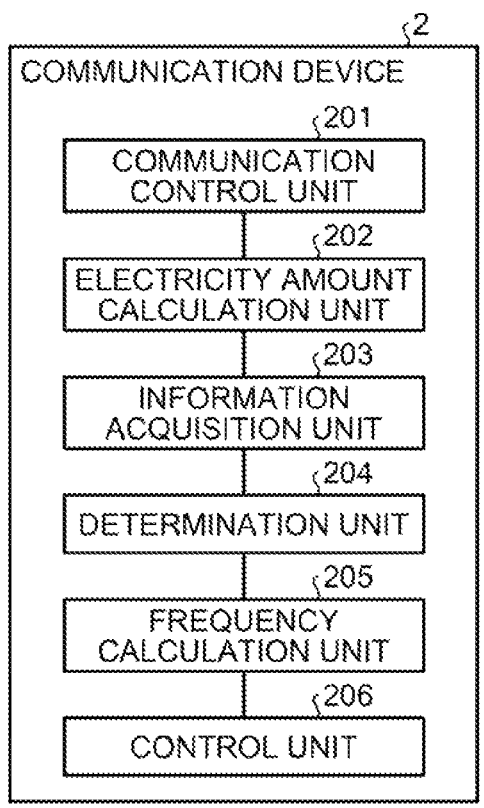
FIG. 6 is a schematic of an exemplary functional block functionally illustrating a communication device including a processor that executes a communication program.

The processor 2j performs overall control of the communication device 2. The processor 2j, for example, acquires the first information generation program 21 stored in the storage device 2g, executes the first information generation program 21 thus acquired, and performs first information generation processing. FIG. 6 is a schematic of an exemplary functional block functionally illustrating the communication device including the processor that executes the first information generation program. As illustrated in FIG. 6, the communication device 2 includes a communication control unit 201, an electricity amount calculation unit 202, an information acquisition unit 203, a determination unit 204, a frequency calculation unit 205, and a control unit 206.

The communication control unit 201 generates a virtual terminal 3v as a substitute for the mobile terminal 3 first. The virtual terminal is also referred to as an "emulator". The virtual terminal 3v performs a handover to the 3G network 4 instead of the mobile terminal 3. Therefore, the mobile terminal 3 does not perform the handover itself. As a result, power consumption caused by the handover is suppressed, whereby it is possible to reduce the power consumption.

Figure 7:
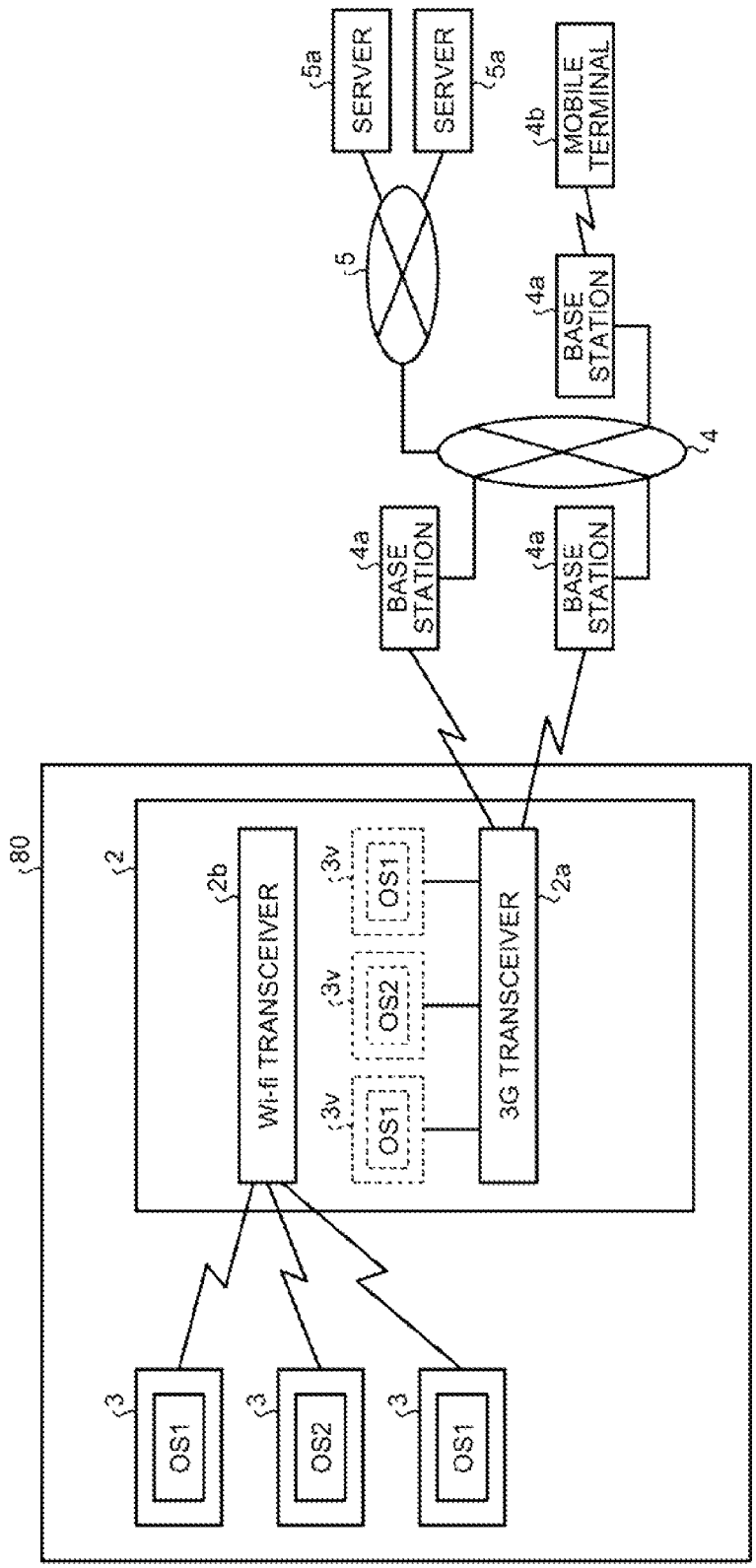
FIG. 7 is a schematic for explaining processing performed in the communication system.

A specific example will be described. FIG. 7 is a schematic for explaining processing performed in the communication system. In the example illustrated in FIG. 7, if a radio wave from the RFID transceiver 2c of the communication device 2 is detected, the communication control unit 201 turns ON the power of the Wi-Fi transceiver 3b of the mobile terminal 3. The RFID transceiver 3c of the mobile terminal 3 then transmits information used for establishing the Wi-Fi communications, such as the MAC address, the SIM, and the model information of the mobile terminal 3, to the communication device 2. Thus, the Wi-Fi communications between the Wi-Fi transceiver 3b of the mobile terminal 3 and the Wi-Fi transceiver 2b of the communication device 2 are established. The RFID transceiver 3c also transmits the remaining amount of electricity available $E_{Batt}$ of a battery 3m at the on-board point 92 to the communication device 2. If the navigation function of the mobile terminal 3 is used, and the destination has been entered therein, the RFID transceiver 3c also transmits the destination to the communication device 2. Furthermore, the RFID transceiver 3c transmits information indicating whether the mobile terminal 3 itself is equipped with a navigation engine to the communication device 2. The information indicating whether the mobile terminal 3 itself is equipped with a navigation engine is hereinafter referred to as "equipment information". The communication control unit 201 turns OFF the power of the 3G transceiver 3a. FIG. 7 illustrates an example in which two mobile terminals 3 that operate with an OS1, and one mobile terminal 3 that operates with an OS2 are present in the moving object 80.

If the communication control unit 201 receives the model information transmitted from the mobile terminal 3, the communication control unit 201 acquires an OS and an application corresponding to the model information by referring to the first table 22. The communication control unit 201 then generates the virtual terminal 3v of the mobile terminal 3 using the OS and the application thus acquired. In the example illustrated in FIG. 7, the communication control unit 201 generates two virtual terminals 3v that operate with the OS1 and one virtual terminal 3v that operates with the OS2.

In the example illustrated in FIG. 7, the virtual terminal 3v transmits an instruction to perform a handover to the 3G transceiver 2a. When receiving the instruction, the 3G transceiver 2a performs the handover to the 3G network 4. At this time, the communication control unit 201 controls the Wi-Fi transceiver 2b so as to transmit the result of the handover performed by the 3G transceiver 2a to the Wi-Fi transceiver 3b of the mobile terminal 3 through the Wi-Fi communications. This allows the virtual terminal 3v to perform the handover via the 3G transceiver 2a. The virtual terminal 3v detects the base station 4a having the highest radio field intensity acquired by the handover at predetermined time intervals. The virtual terminal 3v then communicates with the base station 4a thus detected via the 3G transceiver 2a. As described above, the communication device 2 performs the handover instead of the mobile terminal 3.

Furthermore, in the example illustrated in FIG. 7, if the mobile terminal 3 is to be connected to a server 5a of the Internet 5, the virtual terminal 3v communicates with the server 5a of the Internet 5 via the 3G network 4 instead of the mobile terminal 3. Furthermore, the Wi-Fi transceiver 2b communicates with the mobile terminal 3. In other words, the mobile terminal 3 communicates with the server 5a via the Wi-Fi transceiver 2b, the virtual terminal 3v, and the 3G transceiver 2a. The communication device 2 relays the communications between the mobile terminal 3 and the server 5a of the Internet 5 in this manner, thereby allowing the mobile terminal 3 to perform the Internet communications.

If the Wi-Fi communications between the mobile terminal 3 and the communication device 2 are established, the electricity amount calculation unit 202 calculates the amount of electricity available in the mobile terminal 3 while the Wi-Fi communications between the mobile terminal 3 and the communication device 2 are in a state capable of being performed. A specific example will be described. In the example illustrated in FIG. 1, at the on-board point 92 of the user, the mobile terminal 3 transmits a remaining amount of electricity $E_{Batt}$ of the battery 3m, which will be described later, of the mobile terminal 3 to the communication device 2 by the RFID transceiver 3c. When receiving the amount of electricity $E_{Batt}$, the electricity amount calculation unit 202 subtracts an amount of electricity $E_{BF}$ consumed by the mobile terminal 3 between the off-board point 93 and the destination 91 from the amount of electricity $E_{Batt}$ thus received to obtain the amount of electricity $E_{BUS}$ ($E_{Batt}$-$E_{BF}$). The amount of electricity $E_{BUS}$ is the amount of electricity available in the mobile terminal 3 while the user is traveling from the on-board point 92 to the off-board point 93 by the moving object 80. In other words, the amount of electricity $E_{BUS}$ is the amount of electricity available in the mobile terminal 3 while the Wi-Fi communications between the mobile terminal 3 and the communication device 2 is being established.

At the on-board point 92, if the destination has been entered, the mobile terminal 3 transmits the destination to the communication device 2 by the RFID transceiver 3c. Furthermore, at the on-board point 92, the mobile terminal 3 transmits the equipment information to the communication device 2 by the RFID transceiver 3c.

In the example illustrated in FIG. 1, the electricity amount calculation unit 202 calculates the amount of electricity $E_{BF}$ as follows: the electricity amount calculation unit 202 uses the model information of the mobile terminal 3 included in the connection request described above as a key, and searches the record in which the model information is registered in the model information item from the second table 24. If the record is obtained as a result of the search, the electricity amount calculation unit 202 calculates the amount of electricity $E_{BF}$ by Equation (1):

$$E_{BF}=T_{BF}\times(P_3+P_{GPS})+(E_{Navi}+E_{Disp})\times(T_{BF}\times F_{Updt}) \quad (1)$$

$T_{BF}$ represents traveling time from the off-board point 93 to the destination 91. $P_{3G}$ represents the power registered in the power consumption item of the 3G transceiver in the record thus obtained. $P_{GPS}$ represents the power registered in the power consumption item of the GPS signal receiver and the GPS signal processing engine in the record thus obtained. $E_{Navi}$ represents the amount of electricity registered in the power consumption item of the navigation engine in the record thus obtained. $E_{Disp}$ represents the amount of electricity registered in the power consumption item of the display control device in the record thus obtained. $F_{Updt}$ represents the number of times registered in the update frequency item of the navigation screen in the record thus obtained.

The information acquisition unit 203 acquires information used for generating the navigation information. The information acquisition unit 203, for example, acquires the map information 25 stored in the storage device 2g. The information acquisition unit 203 acquires the traffic information from the traffic information receiver 2i. The information acquisition unit 203 acquires the position information indicating the position of the communication device 2 from the GPS signal processing engine 2e. The information acquisition unit 203 acquires the destination transmitted from the mobile terminal 3.

If the determination unit 204, which will be described later, determines that the equipment information indicates the fact that the mobile terminal 3 itself is equipped with no navigation engine, the information acquisition unit 203 performs the following processing: the information acquisition unit 203 transmits an instruction to display a screen for acquiring the destination from the user, that is, a screen for asking for entry of the destination to the mobile terminal 3 by the Wi-Fi transceiver 2b. As a result, the screen for acquiring the destination from the user is displayed on a display device 3p of the mobile terminal 3. When receiving the destination from the user, the mobile terminal 3 transmits the destination to the communication device 2 by the Wi-Fi transceiver 3b.

The determination unit 204 determines whether the equipment information transmitted from the mobile terminal 3 indicates that the mobile terminal 3 itself is equipped with a navigation engine first. If the equipment information indicates that the mobile terminal 3 itself is equipped with a navigation engine, the determination unit 204 determines whether the amount of electricity $E_{BUS}$ is equal to or larger than a predetermined amount. If the amount of electricity $E_{BUS}$ is smaller than the predetermined amount, the determination unit 204 performs the following processing: the determination unit 204 determines the navigation engine 2f out of the navigation engine 2f and the navigation engine 3f, which will be described later, to be a navigation engine that generates the navigation information to be displayed on the display device 3p of the mobile terminal 3. By contrast, if the amount of electricity $E_{BUS}$ is equal to or larger than the predetermined amount, the determination unit 204 performs the following processing: the determination unit 204 determines the navigation engine 3f out of the navigation engine 2f and the navigation engine 3f to be the navigation engine that generates the navigation information to be displayed on the display device 3p of the mobile terminal 3.

An example of the predetermined amount will now be described. The frequency of generating the navigation information and the frequency of updating the navigation information can be changed within the range according to hardware and software of each model. If the minimum value $F_{Updt\_min}$ is set to the frequency of generating the navigation information and the frequency of updating the navigation information, for example, the frequency of updating the navigation information to be displayed is low, thereby deteriorating the quality of the navigation function. In this case, however, because the number of times the navigation engines 2f and 3f generate the navigation information per unit time is small, the power consumption in the navigation engines 2f and 3f is reduced. By contrast, if the maximum value $F_{Updt}$ is set to the frequency of generating the navigation information and the frequency of updating the navigation information, the frequency of updating the navigation information to be displayed is high, thereby improving the quality of the navigation function. In this case, however, because the number of times the navigation engines 2f and 3f generate the navigation information per unit time is large, the power consumption in the navigation engines 2f and 3f is not reduced. Thus, the relationship between the frequency and the reduction in the power consumption is a relationship of trade off. If the mobile terminal 3 can communicate with the communication device 2, in order to reduce load of the processing in the mobile terminal 3, the processing may performed by the communication device 2.

If the power of the GPS signal receiver 3d and the GPS signal processing engine 3e of the mobile terminal 3 are turned OFF, and the minimum value $F_{Updt\_min}$ is set to the frequency, the determination unit 204 calculates the amount of electricity consumed in the mobile terminal 3. In this case, the determination unit 204 calculates the amount of electricity $E_{st1}$ consumed when the navigation engine 3f generates the navigation information based on the position information, the map information, the traffic information, and the like transmitted from the communication device 2. The determination unit 204 compares the amount of electricity $E_{st1}$ thus calculated and the amount of electricity available $E_{BUS}$. In other words, the determination unit 204 determines the amount of electricity $E_{st1}$ thus calculated to be the predetermined amount described above. The predetermined amount $E_{st1}$ is calculated by Equation (2):

$$E_{st1}=T_{BUS}\times P_{Wifi}+(E_{Navi}+E_{Disp})\times(T_{BUS}\times F_{Updt\_min}) \quad (2)$$

$T_{BUS}$ represents traveling time from the on-board point 92 to the off-board point 93. $P_{Wifi}$ represents the power registered in the power consumption item of the Wi-Fi transceiver in the record thus obtained.

The determination unit 204 compares the predetermined amount $E_{st1}$ thus obtained and the amount of electricity $E_{BUS}$. If the amount of electricity $E_{BUS}$ is smaller than the predetermined amount $E_{st1}$, it is difficult to generate the navigation information by the navigation engine 3f. Therefore, the determination unit 204 performs the following processing. Specifically, if the amount of electricity $E_{BUS}$ is smaller than the predetermined amount $E_{st1}$, the determination unit 204 compares the amount of electricity $E_{BUS}$ and a predetermined amount $E_{st2}$. The predetermined amount $E_{st2}$ used herein means the amount of electricity consumed in the mobile terminal 3 if the power of the GPS signal receiver 3d, the GPS signal processing engine 3e, and the navigation engine 3f of the mobile terminal 3 is turned OFF, and the minimum value $F_{Updt\_min}$ is set to the frequency. The determination unit 204 calculates the amount of electricity $E_{st2}$ consumed when the navigation screen transmitted from the communication device 2 is displayed on the display device 3p of the mobile terminal 3 by Equation (3):

$$E_{st2}=T_{BUS}\times P_{Wifi}+E_{Disp}\times(T_{BUS}\times F_{Updt\_min}) \quad (3)$$

If the amount of electricity $E_{BUS}$ is smaller than the predetermined amount $E_{st2}$, the determination unit 204 determines that it is difficult to display the navigation information on the mobile terminal 3, that is, it is difficult to use the navigation function. In this case, the determination unit 204 sets NULL to a flag (not illustrated). The flag corresponds to each mobile terminal 3. By contrast, if the amount of electricity $E_{BUS}$ is equal to or larger than the predetermined amount $E_{st2}$, the determination unit 204 determines the navigation engine 2f to be the navigation engine that generates the navigation information to be displayed on the display device 3p of the mobile terminal 3.

If the amount of electricity $E_{BUS}$ is equal to or larger than the predetermined amount $E_{st1}$, it is possible to generate the navigation information by the navigation engine 3f. Therefore, the determination unit 204 performs the following processing: the determination unit 204 determines the navigation engine 3f to be the navigation engine that generates the navigation information to be displayed on the display device 3p of the mobile terminal 3.

If the determination unit 204 determines the navigation engine 2f to be the navigation engine, the determination unit 204 sets "1" to the flag in the storage device 2g. By contrast, if the determination unit 204 determines the navigation engine 3f to be the navigation engine, the determination unit 204 sets "0" to the flag. If the equipment information transmitted from the mobile terminal 3 indicates that the mobile terminal 3 is equipped with no navigation engine, the determination unit 204 sets a value to the flag in the same manner as described above in accordance with the comparison result of the amount of electricity $E_{BUS}$ and the predetermined amount $E_{st2}$.

If the amount of electricity $E_{BUS}$ calculated by the electricity amount calculation unit 202 is smaller than the predetermined amount $E_{st1}$, the frequency calculation unit 205 calculates the update frequency that is the frequency of updating display of the navigation information based on the following information. Specifically, the amount of electricity $E_{BUS}$, time $T_{BUS}$ in which the Wi-Fi communications can be performed, and the power consumed in the Wi-Fi transceiver 3b are used for calculating the update frequency. Furthermore, the amount of electricity consumed for updating the navigation information once in the display control device 3o that updates the navigation information to be displayed on the display device 3p of the mobile terminal 3 is also used for calculating the update frequency.

If the amount of electricity $E_{BUS}$ calculated by the electricity amount calculation unit 202 is equal to or larger than the predetermined amount $E_{st1}$, the frequency calculation unit 205 calculates the update frequency based on the following information. Specifically, the amount of electricity $E_{BUS}$, the time $T_{BUS}$ in which the Wi-Fi communications can be performed, and the power consumed in the Wi-Fi transceiver 3b are used for calculating the update frequency. The amount of electricity consumed every time the navigation engine 3f generates the navigation information is also used for calculating the update frequency. Furthermore, the amount of electricity consumed for updating the navigation information once in the display control device 3o that updates the navigation information to be displayed on the display device 3p of the mobile terminal 3 is also used for calculating the update frequency.

If the amount of electricity $E_{BUS}$ is equal to or larger than the predetermined amount $E_{st2}$, the frequency calculation unit 205 compares the amount of electricity $E_{BUS}$ and a predetermined amount $E_{st3}$. The predetermined amount $E_{st3}$ used herein means the amount of electricity consumed in the mobile terminal 3 if the power of the GPS signal receiver 3d, the GPS signal processing engine 3e, and the navigation engine 3f of the mobile terminal 3 is turned OFF, and the maximum value $F_{Updt}$ is set to the frequency. The frequency calculation unit 205 calculates the predetermined amount $E_{st3}$. In this case, the frequency calculation unit 205 calculates the amount of electricity consumed when the navigation information transmitted from the communication device 2 is displayed on the display device 3p of the mobile terminal 3. The predetermined amount $E_{st3}$ is calculated by Equation (4):

$$E_{st3}=T_{BUS} \times P_{Wifi}+E_{Disp} \times (T_{BUS} \times F_{Updt}) \quad (4)$$

If the amount of electricity $E_{BUS}$ is smaller than the predetermined amount $E_{st3}$, the frequency calculation unit 205 calculates frequency F by Equation (5):

$$F=(E_{BUS}-(T_{BUS} \times P_{Wifi}))/(E_{Disp} \times T_{BUS}) \quad (5)$$

By contrast, if the amount of electricity $E_{BUS}$ is equal to or larger than the predetermined amount $E_{st3}$, the frequency calculation unit 205 calculates the frequency F by setting the maximum value $F_{Updt}$ to the frequency F.

As described above, the frequency calculation unit 205 calculates the frequency F as high as possible within the range in which the amount of electricity consumed in the mobile terminal 3 does not exceed the amount of electricity available in the battery 3m. In other words, the frequency calculation unit 205 calculates the frequency F for realizing a high-quality navigation function within the range in which the amount of electricity consumed does not exceed the amount of electricity available. Accordingly, with the system 1, a navigation function with appropriate accuracy can be realized in accordance with the state of the battery 3m.

If the amount of electricity $E_{BUS}$ is equal to or larger than the predetermined amount $E_{st1}$, the frequency calculation unit 205 compares the amount of electricity $E_{BUS}$ and a predetermined amount $E_{st4}$. The predetermined amount $E_{st4}$ used herein means the amount of electricity consumed in the mobile terminal 3 if the power of the GPS signal receiver 3d and the GPS signal processing engine 3e of the mobile terminal 3 is turned OFF, and the maximum value $F_{Updt}$ is set to the frequency. The frequency calculation unit 205 calculates the predetermined amount $E_{st4}$. In this case, the frequency calculation unit 205 calculates the amount of electricity consumed when the navigation engine 3f generates the navigation information based on the position information, the map information, and the traffic information transmitted from the communication device 2, the destination received by the mobile terminal 3, and the like. The predetermined amount $E_{st4}$ is calculated by Equation (6):

$$E_{st4}=T_{BUS} \times P_{Wifi}+(E_{Navi}+E_{Disp}) \times (T_{BUS} \times F_{Updt}) \quad (6)$$

If the amount of electricity $E_{BUS}$ is equal to or larger than the predetermined amount $E_{st4}$, the frequency calculation unit 205 calculates the frequency F by setting the maximum value $F_{Updt}$ to the frequency F.

By contrast, if the amount of electricity $E_{BUS}$ is smaller than the predetermined amount $E_{st4}$, the frequency calculation unit 205 calculates the frequency F by Equation (7):

$$F=(E_{BUS}-(T_{BUS} \times P_{Wifi}))/(E_{Disp}+E_{Navi}) \times T_{BUS}) \quad (7)$$

As described above, the frequency calculation unit 205 calculates the frequency F as high as possible within the range in which the amount of electricity consumed in the mobile terminal 3 does not exceed the amount of electricity available in the battery 3m. In other words, the frequency calculation unit 205 calculates the frequency F for realizing a high-quality navigation function within the range in which the amount of electricity consumed does not exceed the amount of electricity available. Accordingly, with the system 1, a navigation function with appropriate accuracy can be realized in accordance with the state of the battery 3*m*.

If the determination unit 204 determines the navigation engine 2*f* to be the navigation engine, the control unit 206 controls the mobile terminal 3 so as to stop supplying power to the navigation engine 3*f*, and to output the navigation information generated by the navigation engine 2*f*. In addition, if the determination unit 204 determines the navigation engine 2*f* to be the navigation engine, the control unit 206 controls the mobile terminal 3 so as to stop supplying power to the GPS signal receiver 3*d* and the GPS signal processing engine 3*e*.

A specific example will be described. The control unit 206, for example, acquires the value of the flag first. If the value of the flag is "NULL", the control unit 206 transmits an instruction to turn OFF the power of the GPS signal receiver 3*d*, the GPS signal processing engine 3*e*, and the navigation engine 3*f* of the mobile terminal 3 to the mobile terminal 3 by the Wi-Fi transceiver 2*b*. Thus, in the mobile terminal 3, the power of the GPS signal receiver 3*d*, the GPS signal processing engine 3*e*, and the navigation engine 3*f* is turned OFF. When receiving a connection termination request from the mobile terminal 3, the control unit 206 transmits an instruction to turn ON the power of the GPS signal receiver 3*d*, the GPS signal processing engine 3*e*, and the navigation engine 3*f* of the mobile terminal 3 to the mobile terminal 3 by the Wi-Fi transceiver 2*b*. Thus, in the mobile terminal 3, the power of the GPS signal receiver 3*d*, the GPS signal processing engine 3*e*, and the navigation engine 3*f* is turned ON. Accordingly, with the system 1, it is possible to reduce the amount of electricity consumed in the GPS signal receiver 3*d*, the GPS signal processing engine 3*e*, and the navigation engine 3*f*.

If the value of the flag is "1", that is, if the determination unit 204 determines the navigation engine 2*f* to be the navigation engine, the control unit 206 performs the following processing. Specifically, the control unit 206 transmits an instruction to turn OFF the power of the GPS signal receiver 3*d*, the GPS signal processing engine 3*e*, and the navigation engine 3*f* of the mobile terminal 3 to the mobile terminal 3 by the Wi-Fi transceiver 2*b*. The control unit 206 then transmits an instruction to generate the navigation information at the frequency F calculated by the frequency calculation unit 205 to the navigation engine 2*f*. This causes the navigation engine 2*f* to generate the navigation information at the frequency F. The control unit 206 then transmits an instruction to display the navigation information generated by the navigation engine 2*f* at the frequency F to the mobile terminal 3 by the Wi-Fi transceiver 2*b*. Subsequently, the control unit 206 acquires the navigation information from the navigation engine 2*f* at time intervals of 1/F. The control unit 206 then transmits the navigation information thus acquired at time intervals of 1/F to the mobile terminal 3 by the Wi-Fi transceiver 2*b*. Thus, in the mobile terminal 3, the navigation information transmitted from the communication device 2 through the Wi-Fi communications is displayed on the display device 3*p*, and updated at the update frequency indicated by the frequency F. When receiving a connection termination request from the mobile terminal 3, the control unit 206 transmits an instruction to turn ON the power of the GPS signal receiver 3*d*, the GPS signal processing engine 3*e*, and the navigation engine 3*f* of the mobile terminal 3 to the mobile terminal 3 by the Wi-Fi transceiver 2*b*. Accordingly, with the system 1, it is possible to reduce the amount of electricity consumed in the GPS signal receiver 3*d*, the GPS signal processing engine 3*e*, and the navigation engine 3*f*. Furthermore, with the system 1, even a mobile terminal equipped with no navigation engine can output the navigation information.

If the value of the flag is "0", that is, if the determination unit 204 determines the navigation engine 3*f* to be the navigation engine, the control unit 206 performs the following processing. Specifically, the control unit 206 transmits an instruction to turn OFF the power of the GPS signal receiver 3*d*, and the GPS signal processing engine 3*e* to the mobile terminal 3 by the Wi-Fi transceiver 2*b*. This causes the mobile terminal 3 to turn OFF the power of the GPS signal receiver 3*d*, and the GPS signal processing engine 3*e*. The control unit 206 then transmits an instruction to generate the navigation information at the frequency F calculated by the frequency calculation unit 205 to the navigation engine 3*f* by the Wi-Fi transceiver 2*b*. This causes the navigation engine 3*f* to generate the navigation information at the frequency F. The control unit 206 then acquires the position information from the GPS signal processing engine 3*e* at time intervals of 1/F. Furthermore, the control unit 206 acquires the map information 25 at time intervals of 1/F. In addition, the control unit 206 acquires the traffic information from the traffic information receiver 2*i* at time intervals of 1/F. The control unit 206 then transmits the position information, the map information 25, and the traffic information thus acquired to the mobile terminal 3 by the Wi-Fi transceiver 2*b* at time intervals of 1/F. This causes the navigation engine 3*f* of the mobile terminal 3 to generate the navigation information based on the position information, the map information 25, the traffic information, and the like transmitted from the communication device 2 through the Wi-Fi communications at time intervals of 1/F. In the display device 3*p* of the mobile terminal 3, the navigation information is updated at the update frequency indicated by the frequency F. When receiving a connection termination request from the mobile terminal 3, the control unit 206 transmits an instruction to turn ON the power of the GPS signal receiver 3*d*, and the GPS signal processing engine 3*e* of the mobile terminal 3 to the mobile terminal 3 by the Wi-Fi transceiver 2*b*. Accordingly, with the system 1, it is possible to reduce the amount of electricity consumed in the GPS signal receiver 3*d*, and the GPS signal processing engine 3*e*.

As described above, with the system 1, in the case where the Wi-Fi communications whose power consumption is lower than that of the 3G communications can be performed between the mobile terminal 3 and the communication device 2, if the amount of electricity available in the mobile terminal 3 exceeds a threshold value, the power consumption in the mobile terminal 3 can be reduced.

With the system 1, it is possible to reduce the amount of electricity consumed in the GPS signal receiver 3*d*, the GPS signal processing engine 3*e*, the navigation engine 3*f*, and the like. Furthermore, with the system 1, even a mobile terminal equipped with no navigation engine can output the navigation information.

Referring back to the explanation of FIG. 2, the mobile terminal 3 is a terminal carried by the user. Examples of the mobile terminal 3 include a terminal, such as a personal digital assistant (PDA), and a smartphone. The mobile terminal 3 includes the 3G transceiver 3*a*, the Wi-Fi transceiver 3*b*, the RFID transceiver 3*c*, the GPS signal receiver 3*d*, the GPS signal processing engine 3*e*, the navigation engine 3*f*, a storage device 3*g*, an I/O interface 3*h*, and a processor 3*i*. The mobile terminal 3 further includes a user interface 3*j*, a SIM card 3*k*, a power supply control unit 3*l*, the battery 3*m*, the display control device 3*o*, and the display device 3*p*. The 3G transceiver 3*a*, the Wi-Fi transceiver 3*b*, the RFID transceiver 3c, the GPS signal receiver 3d, the GPS signal processing engine 3e, the navigation engine 3f, the storage device 3g, the I/O interface 3h, and the processor 3i are connected via a bus 3n. In addition, the user interface 3j, the SIM card 3k, the power supply control unit 3l, and the display control device 3o are also connected to the bus 3n. Therefore, the equipment connected to the bus 3n can communicate with each other.

The 3G transceiver 3a communicates with the base station 4a of the 3G network 4 using the 3G antenna. In the example illustrated in FIG. 1, because the power of the 3G transceiver 3a is turned OFF between the on-board point 92 and the off-board point 93, the power consumption is reduced.

The Wi-Fi transceiver 3b performs the Wi-Fi communications using a Wi-Fi antenna. The Wi-Fi transceiver 3b, for example, performs the Wi-Fi communications with the Wi-Fi transceiver 2a of the communication device 2 using the Wi-Fi antenna. In the example illustrated in FIG. 1, because the power of the Wi-Fi transceiver 3b is turned OFF between the departure point 90 and the on-board point 92, and between the off-board point 93 and the destination 91, the power consumption is reduced.

The RFID transceiver 3c performs communications using an RFID antenna. The RFID transceiver 3c, for example, communicates with the RFID transceiver 2c of the communication device 2 using the RFID antenna.

The GPS signal receiver 3d receives a GPS signal from a GPS satellite, and transmits the GPS signal to the GPS signal processing engine 3e. The GPS signal processing engine 3e performs processing for detecting the position of the GPS signal processing engine 3e on the GPS signal transmitted from the GPS signal receiver 3d to detect the position, and generates the position information indicating the position. Because the GPS signal processing engine 3e is included in the mobile terminal 3, the position of the GPS signal processing engine 3e can be considered as the position of the mobile terminal 3. In the example illustrated in FIG. 1, because the power of the GPS signal receiver 3d and the GPS signal processing engine 3e is turned OFF between the on-board point 92 and the off-board point 93, the power consumption is reduced in the GPS signal receiver 3d and the GPS signal processing engine 3e.

The navigation engine 3f generates the navigation information such as a navigation screen. Based on the position information, the destination, the map information, and the traffic information, for example, the navigation engine 3f searches a route from the position indicated by the position information to the destination. The navigation engine 3f then generates the navigation information such as a navigation screen on which the route obtained as a result of the route search is displayed. In the example illustrated in FIG. 1, between the departure point 90 and the on-board point 92, and between the off-board point 93 and the destination 91, the navigation engine 3f generates the navigation information based on the destination, the position information, and the map information and the traffic information acquired from an external server by the 3G transceiver 3a. Furthermore, if the power of navigation engine 3f is turned OFF while the user is on board the moving object 80 between the on-board point 92 and the off-board point 93, the navigation engine 3f does not perform various types of processing including processing of the route search. As a result, the power consumption is reduced in the navigation engine 3f. Furthermore, the navigation engine 3f generates the navigation information such as a navigation screen on which the route obtained as a result of the route search is displayed at predetermined update frequency, or at update frequency instructed by the communication device 2. Note that, the navigation engine 3f is an example of the generation unit.

The storage device 3g stores therein a second information generation program 31.

The second information generation program 31 is a program for performing second information generation processing for controlling generation of the navigation information.

The I/O interface 3h is connected to an external device, and controls input and output of data to and from the external device. For the I/O interface 3h, a serial port, or a USB port can be used, for example.

Figure 8:
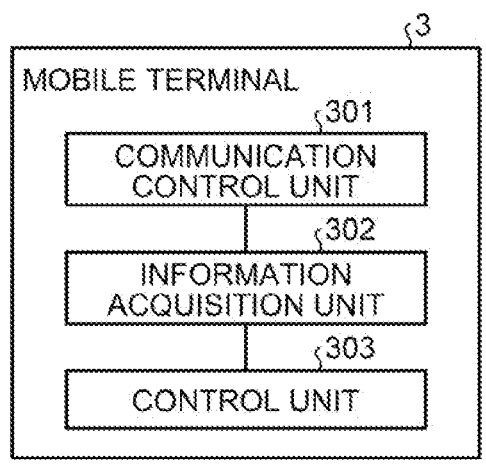
FIG. 8 is a schematic of an exemplary functional block functionally illustrating the mobile terminal including a processor that executes the communication program.

The processor 3i performs overall control of the mobile terminal 3. For example, the processor 3i acquires the second information generation program 31 stored in the storage device 3g, and executes the second information generation program 31 thus acquired. FIG. 8 is a schematic of an exemplary functional block functionally illustrating the mobile terminal including the processor that executes the second information generation program. In the example illustrated in FIG. 8, the mobile terminal 3 includes a communication control unit 301, an information acquisition unit 302, and a control unit 303.

In the example illustrated in FIG. 7, if the RFID transceiver 3c of the mobile terminal 3 detects a radio wave from the RFID transceiver 2c of the communication device 2, the RFID transceiver 3c transmits the information used for establishing the Wi-Fi communications, such as a connection request, to the mobile terminal 3. The connection request includes the MAC address, the SIM, and the model information of the mobile terminal 3. The communication control unit 301 then turns ON the power of the Wi-Fi transceiver 3b of the mobile terminal 3. Thus, the Wi-Fi communications between the Wi-Fi transceiver 2b of the communication device 2 and the Wi-Fi transceiver 3b of the mobile terminal 3 are established. If the radio wave from the RFID transceiver 2c of the communication device 2 is detected, the communication control unit 301 turns OFF the power of the 3G transceiver of the mobile terminal 3.

When detecting a radio wave from the RFID transceiver 2c of the communication device 2, the RFID transceiver 3c of the mobile terminal 3 transmits the equipment information, and the amount of electricity $E_{Batt}$ to the mobile terminal 3. Furthermore, in the case where the destination has been entered, when detecting a radio wave from the RFID transceiver 2c of the communication device 2, the RFID transceiver 3c of the mobile terminal 3 transmits the destination to the mobile terminal 3. Thus, the virtual terminal 3v of the mobile terminal 3 is generated in the communication device 2.

The information acquisition unit 302 acquires information used for generating the navigation information. The information acquisition unit 302, for example, acquires the position information from the GPS signal processing engine 3e. The information acquisition unit 302 also acquires the map information and the traffic information acquired from an external server via the 3G transceiver 3a. The information acquisition unit 302 also acquires the position information, the traffic information, and the map information transmitted from the communication device 2.

Furthermore, the information acquisition unit 302 also acquires the instruction, the navigation information, and the like transmitted from the communication device 2.

If the amount of electricity $E_{BUS}$ available in the mobile terminal 3 itself is smaller than the predetermined amount $E_{st1}$, the control unit 303 acquires the navigation information generated in the communication device 2 capable of communicating with the mobile terminal 3 itself. Furthermore, if the amount of electricity $E_{BUS}$ available in the mobile terminal 3 itself is smaller than the predetermined amount $E_{st1}$, the control unit 303 stops supplying power to the GPS signal receiver 3d, the GPS signal processing engine 3e, and the navigation engine 3f. By contrast, if the amount of electricity $E_{BUS}$ is equal to or larger than the predetermined amount $E_{st1}$, the control unit 303 controls the navigation engine 3f so as to generate the navigation information based on the position information, the traffic information, and the map information transmitted from the communication device 2.

Figure 9:
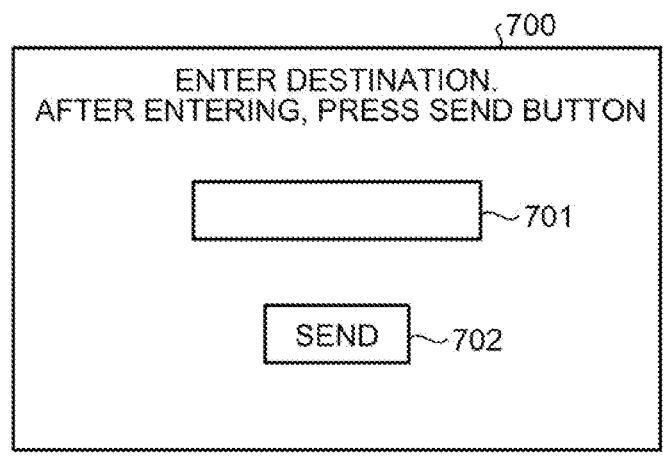
FIG. 9 illustrates an example of a screen for asking for entry of a destination.

A specific example will be described. If the instruction transmitted from the communication device 2 is an instruction to display a screen for acquiring the destination from the user, the control unit 303 transmits an instruction to display the screen for asking for entry of the destination to the display control device 3o, which will be described later. Thus, the display control device causes the display device 3p to display the screen for asking for entry of the destination. FIG. 9 illustrates an example of the screen for asking for entry of the destination. In the example illustrated in FIG. 9, a screen 700 for asking for entry of the destination includes a message "Enter a destination. After the entering, press the send button". In the example illustrated in FIG. 9, the user can enter the destination in a text box 701. In the example illustrated in FIG. 9, after the destination is entered in the text box 701, and the user presses a send button 702, the control unit 303 transmits the destination to the communication device 2 by the Wi-Fi transceiver 3b.

If the instruction transmitted from the communication device 2 is an instruction to turn OFF the power of equipment, the control unit 303 turns OFF the power of the equipment in accordance with the instruction. At the on-board point 92 illustrated in FIG. 1, for example, if the instruction transmitted from the communication device 2 is an instruction to turn OFF the power of the GPS signal receiver 3d, the GPS signal processing engine 3e, and the navigation engine 3f, the control unit 303 performs the following processing: the control unit 303 transmits an instruction to turn OFF the power of the GPS signal receiver 3d, the GPS signal processing engine 3e, and the navigation engine 3f to the power supply control unit 3l, which will be described later. This causes the power supply control unit 3l to turn OFF the power of the GPS signal receiver 3d, the GPS signal processing engine 3e, and the navigation engine 3f. Accordingly, with the system 1, it is possible to reduce the amount of power consumed in the GPS signal receiver 3d, the GPS signal processing engine 3e, and the navigation engine 3f. Furthermore, at the on-board point 92 illustrated in FIG. 1, if the instruction transmitted from the communication device 2 is an instruction to turn OFF the power of the GPS signal receiver 3d, and the GPS signal processing engine 3e, the control unit 303 performs the following processing: the control unit 303 transmits an instruction to turn OFF the power of the GPS signal receiver 3d, and the GPS signal processing engine 3e to the power supply control unit 3l, which will be described later. This causes the power supply control unit 3l to turn OFF the power of the GPS signal receiver 3d, and the GPS signal processing engine 3e. Accordingly, with the system 1, it is possible to reduce the amount of power consumed in the GPS signal receiver 3d, and the GPS signal processing engine 3e.

If the instruction transmitted from the communication device 2 is an instruction to turn ON the power of equipment, the control unit 303 turns ON the power of the equipment in accordance with the instruction. At the off-board point 93 illustrated in FIG. 1, for example, if the instruction transmitted from the communication device 2 is an instruction to turn ON the power of the GPS signal receiver 3d, the GPS signal processing engine 3e, and the navigation engine 3f, the control unit 303 performs the following processing: the control unit 303 transmits an instruction to turn ON the power of the GPS signal receiver 3d, the GPS signal processing engine 3e, and the navigation engine 3f to the power supply control unit 3l. This causes the power supply control unit 3l to turn ON the power of the GPS signal receiver 3d, the GPS signal processing engine 3e, and the navigation engine 3f. Furthermore, at the off-board point 93 illustrated in FIG. 1, if the instruction transmitted from the communication device 2 is an instruction to turn ON the power of the GPS signal receiver 3d, and the GPS signal processing engine 3e, the control unit 303 performs the following processing: the control unit 303 transmits an instruction to turn ON the power of the GPS signal receiver 3d, and the GPS signal processing engine 3e to the power supply control unit 3l. This causes the power supply control unit 3l to turn ON the power of the GPS signal receiver 3d, and the GPS signal processing engine 3e.

If the instruction transmitted from the communication device 2 is an instruction to generate the navigation information at the frequency F, the control unit 303 transmits an instruction to generate the navigation information at the frequency F to the navigation engine 3f. This causes the navigation engine 3f to generate the navigation information at the frequency F.

If the instruction transmitted from the communication device 2 is an instruction to display the navigation information at the frequency F, the control unit 303 transmits an instruction to display the navigation information at the frequency F to the display control device 3o. Thus, the display control device 3o causes the display device 3p to display the navigation information transmitted from the communication device 2 at the frequency F. Accordingly, with the system 1, even a mobile terminal equipped with no navigation engine can output the navigation information. In other words, even a mobile terminal including no navigation information can use the navigation function.

If the control unit 303 receives the position information, the map information, and the traffic information transmitted from the communication device 2, the control unit 303 transmits the position information, the map information, and the traffic information to the navigation engine 3f. Thus, in the navigation engine 3f, the navigation information is generated based on the position information, the map information, and the traffic information.

Furthermore, if the control unit 303 receives the navigation information transmitted from the communication device 2, the control unit 303 transmits the navigation information to the display control device 3o. Thus, the display control device 3o causes the display device 3p to display the navigation information.

The user interface 3j controls input and output of data to and from the user. For the user interface 3j, a display, a keyboard, a microphone, and a speaker can be employed. A SIM card 3k stores therein a SIM number uniquely allocated to the mobile terminal 3. Examples of the SIM number include a unique ID number, that is, international mobile subscriber identity (IMSI) used for identifying a telephone number.

The power supply control unit 3l controls power supplied from the battery 3m to each piece of equipment of the mobile terminal 3. Furthermore, the power supply control unit 3l receives an instruction from the processor 3i, and turns ON and OFF the power of each piece of the equipment. The battery 3m supplies power used for operating each piece of the equipment of the mobile terminal 3 to each piece of the equipment via the power supply control unit 3l.

The display control device 3o controls a display content of the display device 3p. Every time the navigation engine 3f generates the navigation information, for example, the display control device 3o controls the display device 3p so as to display the navigation information thus generated. Every time the display control device 3o receives the navigation information from the communication device 2, the display control device 3o controls the display device 3p so as to display the navigation information thus received. Furthermore, when receiving the instruction to display the navigation information at the frequency F, the display control device causes the display device 3p to display the navigation information at the frequency F. The display device 3p displays various pieces of information. Examples of the display device 3p include a liquid crystal display.

At the on-board point 92 illustrated in FIG. 1, if the amount of electricity $E_{BUS}$ available in the battery 3m of the mobile terminal 3 between the on-board point 92 and the off-board point 93 does not exceed the threshold value, the mobile terminal 3 performs the following processing: the mobile terminal 3 turns OFF the power of the GPS signal receiver 3d, the GPS signal processing engine 3e, and the navigation engine 3f of the mobile terminal 3. During this time period, the mobile terminal 3 displays the navigation information transmitted from the communication device 2.

As a result, if the amount of electricity $E_{BUS}$ available between the on-board point 92 and the off-board point 93 does not exceed the threshold value, the mobile terminal 3 can reduce the power consumption in the GPS signal receiver 3d, the GPS signal processing engine 3e, and the navigation engine 3f. Even if the mobile terminal 3 includes no navigation engine, the mobile terminal 3 can output the navigation information.

By contrast, at the on-board point 92, if the amount of electricity $E_{BUS}$ available in the battery 3m of the mobile terminal 3 between the on-board point 92 and the off-board point 93 exceeds the threshold value, the mobile terminal 3 performs the following processing: the mobile terminal 3 turns OFF the power of the GPS signal receiver 3d and the GPS signal processing engine 3e of the mobile terminal 3. During this time period, the mobile terminal 3 acquires the information used for generating the navigation information transmitted from the communication device 2, uses the information thus acquired to generate the navigation information, and displays the navigation information thus generated.

As a result, if the amount of electricity $E_{BUS}$ exceeds the threshold value, the mobile terminal 3 can reduce the power consumption in equipment that acquire the information used for generating the navigation information, such as the GPS signal receiver 3d and the GPS signal processing engine 3e, between the on-board point 92 and the off-board point 93.

Connection of the Communication Device 2 and the Mobile Terminal 3 in the Wi-Fi Communications An explanation will be made of sequential processing from connection of the communication device 2 and the mobile terminal 3 in the Wi-Fi communications to termination of the connection therebetween, the first information generation processing, and the second information generation processing with reference to FIG. 10 to FIG. 18. Specifically, the connection of the communication device 2 and the mobile terminal 3 in the Wi-Fi communications at the on-board point 92 illustrated in FIG. 1 will be described with reference to FIG. 10 first. In other words, with reference to FIG. 10, an explanation will be made of the association in the Wi-Fi communications between the communication device 2 and the mobile terminal 3, the authentication of the mobile terminal 3 performed by the communication device 2, and the establishment of the Wi-Fi communications between the communication device 2 and the mobile terminal 3 illustrated in FIG. 1.

Figure 10:
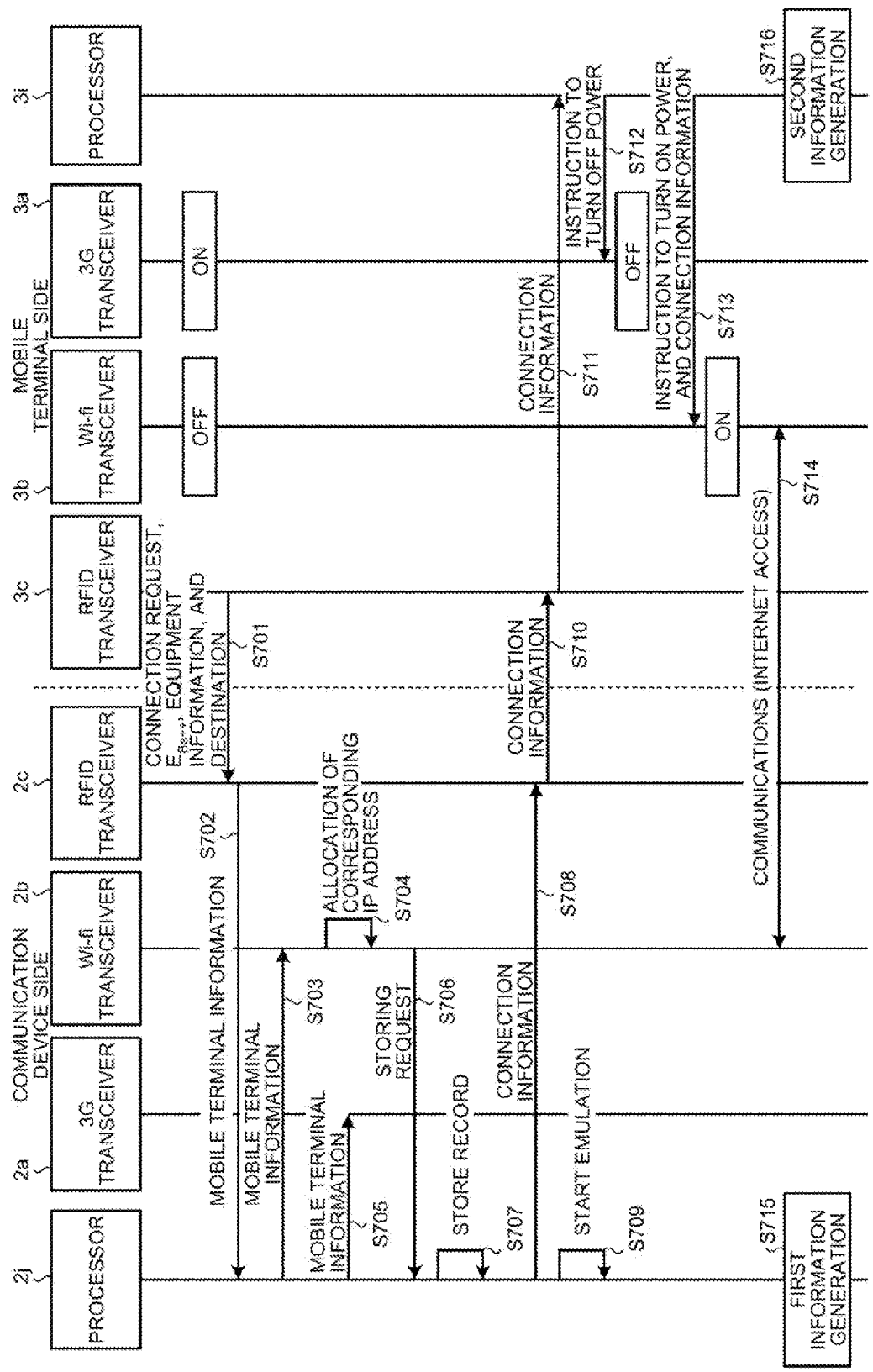
FIG. 10 is a sequence diagram illustrating a detail of connection of the communication device and the mobile terminal in Wi-Fi communications.

FIG. 10 is a sequence diagram illustrating a detail of the connection of the communication device and the mobile terminal in the Wi-Fi communications. FIG. 10 illustrates an example in which the mobile terminal 3 is present in the moving object 80, and performs connection request for the Wi-Fi communications.

An assumption is made that the RFID transceiver 2c of the communication device 2 is present within the communication range of the RFID transceiver 3c of the mobile terminal 3, and that the RFID transceivers 2c and 3c move to a state capable of communicating with each other. For example, the user of the mobile terminal 3 brings the RFID transceiver 3c of the mobile terminal 3 closer to the RFID transceiver 2c of the communication device 2, whereby they move to the state capable of communicating with each other.

If the RFID transceiver 3c of the mobile terminal 3 is in the state capable of communicating with the RFID transceiver 2c of the communication device 2, the RFID transceiver 3c of the mobile terminal 3 transmits a connection request, the amount of electricity $E_{Batt}$ available, and the equipment information to the RFID transceiver 2c of the communication device 2 (Step S701). The connection request includes the MAC address, the SIM, and the model information of the mobile terminal 3. If the destination has been entered in the mobile terminal 3, the RFID transceiver 3c also transmits the destination to the RFID transceiver 2c of the communication device 2 at Step S701.

As well as transferring the connection request thus received to the processor 2j of the communication device 2 as mobile terminal information of the mobile terminal 3, the RFID transceiver 2c of the communication device 2 transfers the amount of electricity $E_{Batt}$, the equipment information, the destination, and the like to the processor 2j of the communication device 2 (Step S702). The processor 2j of the communication device 2 then transfers the MAC address in the mobile terminal information thus received to the Wi-Fi transceiver 2b (Step S703). The Wi-Fi transceiver 2b that has received the MAC address performs allocation of an IP address corresponding to the MAC address (Step S704). Thus, the communication device 2 associates the communication device 2 and the mobile terminal 3 for the Wi-Fi communications.

The processor 2j of the communication device 2 then transfers the SIM and the model information in the mobile terminal information to the 3G transceiver 2a (Step S705). The 3G transceiver 2a of the communication device 2 queries a certification body (e.g., the telecommunications carrier of the mobile terminal 3) via the base station 4a about the validity of the SIM and the model information, and authenticates the mobile terminal 3.

The Wi-Fi transceiver 2b of the communication device 2 transfers a storing request of a record composed of the IP address thus allocated, the SIM, and the MAC address to the processor 2j of the communication device 2 (Step S706). If the mobile terminal 3 is not authenticated, the processor 2j of the communication device 2 discards the storing request of the record thus received, and does not perform the connection with the mobile terminal 3 in the Wi-Fi communications.

If the mobile terminal 3 is authenticated, when receiving the storing request, the processor 2j of the communication device 2 stores the SIM, the MAC address, and the IP address included in the storing request in the first table 22 as the record (Step S707). Furthermore, the processor 2j of the communication device 2 transfers the IP address included in the storing request to the RFID transceiver 2c as connection information (Step S708). The processor 2j of the communication device 2 then identifies the OS of the mobile terminal 3 from the model information, and generates the virtual terminal 3v corresponding to the OS thus identified to start emulation of the mobile terminal 3 (Step S709).

The RFID transceiver 2c of the communication device 2 then transmits the connection information thus received to the RFID transceiver 3c of the mobile terminal 3 (Step S710). The connection information includes service set identifier (SSID), a channel, and the IP address.

This allows the mobile terminal 3 to receive the connection information for establishing the Wi-Fi communications without causing the Wi-Fi transceiver 3b to perform scanning for the Wi-Fi transceiver 2b of the communication device 2. Therefore, the mobile terminal 3 can reduce the power consumed for the scanning for the Wi-Fi transceiver 2b of the communication device 2 conventionally performed by the Wi-Fi transceiver 3b.

Subsequently, the RFID transceiver 3c of the mobile terminal 3 transfers the connection information thus received to the processor 3i of the mobile terminal 3 (Step S711). When receiving the connection request, the processor 3i of the mobile terminal 3 transmits an instruction to turn OFF the power of the 3G transceiver 3a to the power supply control unit 3l, thereby turning OFF the power of the 3G transceiver 3a (Step S712).

Furthermore, the processor 3i of the mobile terminal 3 transmits an instruction to turn ON the power of the Wi-Fi transceiver 3b to the power supply control unit 3l, and transfers the connection information to the Wi-Fi transceiver 3b (Step S713). The Wi-Fi transceiver 3b of the mobile terminal 3 then connects to the communication device 2 via the Wi-Fi communications based on the connection information, and performs the Internet communications via the communication device 2 (Step S714).

The processor 2j of the communication device 2 then performs the first information generation processing (Step S715). The processor 3i of the mobile terminal 3 performs the second information generation processing (Step S716).

The communication device 2 and the mobile terminal 3 establish the Wi-Fi communications therebetween in this manner. Therefore, the mobile terminal 3 can perform the Internet communications via the communication device 2.

Thus, the mobile terminal 3 causes the communication device 2 to generate the virtual terminal 3v, and to perform the handover conventionally performed to maintain the speech quality with the 3G network 4 instead of the mobile terminal 3. As a result, the mobile terminal 3 need not perform the handover, and sets the 3G transceiver 3a to be incapable of communicating, thereby reducing the power consumption.

Furthermore, the user of the mobile terminal 3 can communicate with the 3G network 4 via the communication device 2 by the Wi-Fi communications thus established. Therefore, the user can perform the Internet communications and telephone conversations even if the 3G transceiver 3a is set incapable of communicating.

Figure 11:
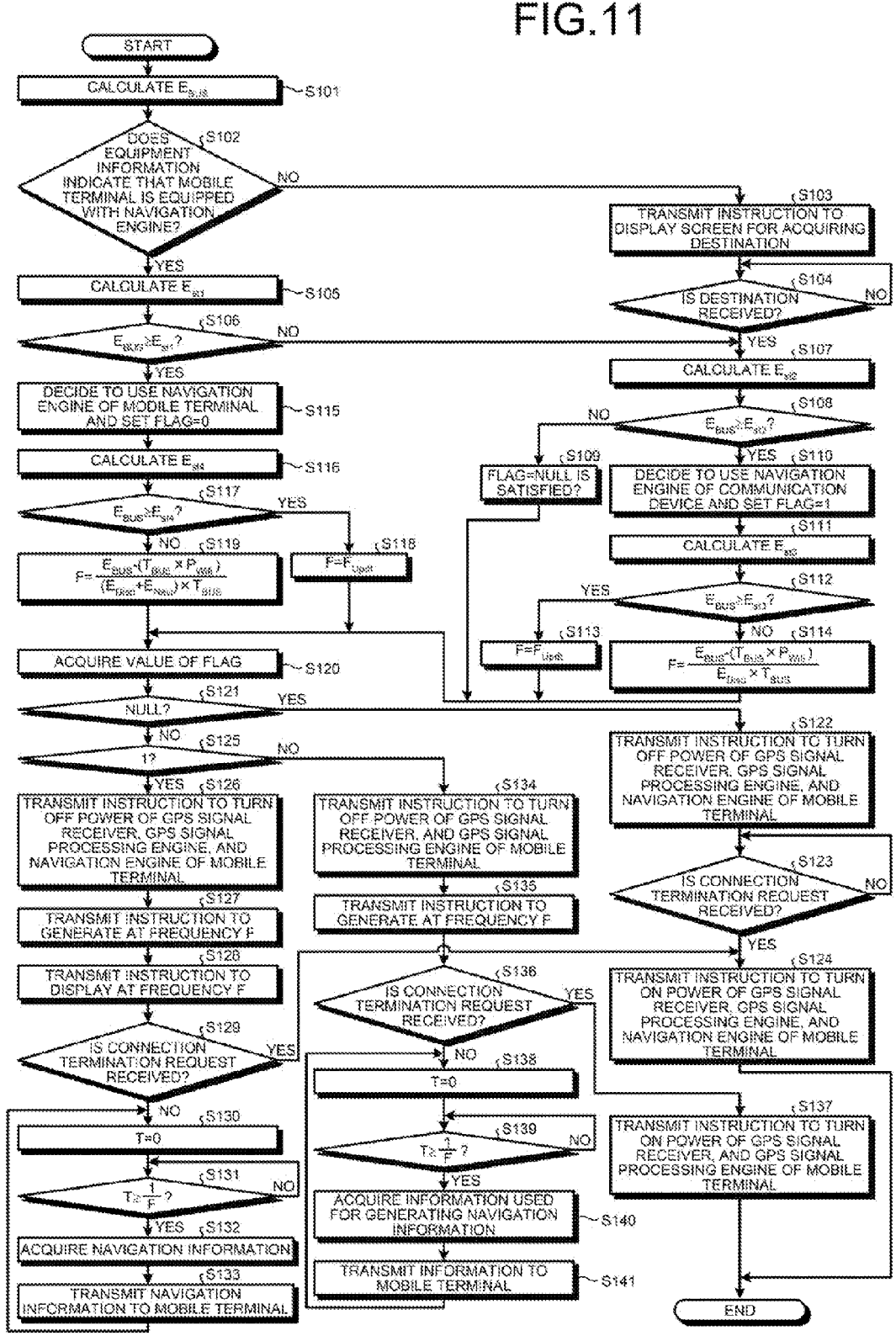
FIG. 11 is a flowchart illustrating a process of first information generation processing according to the first embodiment.

The first information generation processing performed by the processor 2j of the communication device 2 will now be described. FIG. 11 is a flowchart illustrating a process of the first information generation processing according to the first embodiment.

As illustrated in FIG. 11, the electricity amount calculation unit 202 calculates the amount of electricity $E_{BUS}$ (Step S101). The determination unit 204 determines whether the equipment information transmitted from the mobile terminal 3 indicates that the mobile terminal 3 itself is equipped with a navigation engine (Step S102). If the equipment information indicates that the mobile terminal 3 itself is equipped with no navigation engine (NO at Step S102), the information acquisition unit 203 transmits an instruction to display a screen for acquiring the destination from the user to the mobile terminal 3 by the Wi-Fi transceiver 2b (Step S103). As a result, the screen for acquiring the destination from the user is displayed on the display device 3p of the mobile terminal 3. The information acquisition unit 203 then determines whether the destination transmitted from the mobile terminal 3 is received (Step S104). If the destination is not received yet (NO at Step S104), the information acquisition unit 203 redetermines whether the destination is received. By contrast, if the destination is received (YES at Step S104), the system control goes to Step S107.

If the equipment information indicates that the mobile terminal 3 itself is equipped with a navigation engine (YES at Step S102), the determination unit 204 calculates the amount of electricity $E_{st1}$ (Step S105). The determination unit 204 then determines whether the amount of electricity $E_{BUS}$ is equal to or larger than the amount of electricity $E_{st1}$ (Step S106). If the amount of electricity $E_{BUS}$ is smaller than the amount of electricity $E_{st1}$ (NO at Step S106), the determination unit 204 calculates the amount of electricity $E_{st2}$ (Step S107). The determination unit 204 then determines whether the amount of electricity $E_{BUS}$ is equal to or larger than the amount of electricity $E_{st2}$ (Step S108). If the amount of electricity $E_{BUS}$ is smaller than the amount of electricity $E_{st2}$ (NO at Step S108), because it is difficult to cause the mobile terminal 3 to display the navigation information, that is, it is difficult to use the navigation information, the determination unit 204 performs the following processing: the determination unit 204 sets NULL to the flag (Step S109), and the system control goes to Step S120.

By contrast, if the amount of electricity $E_{BUS}$ is equal to or larger than the amount of electricity $E_{st2}$ (YES at Step S108), the determination unit 204 determines the navigation engine 2f to be the navigation engine that generates the navigation information to be displayed on the display device 3p of the mobile terminal 3, and sets "1" to the flag (Step S110). Subsequently, the frequency calculation unit 205 calculates the amount of electricity $E_{st3}$ (Step S111). The frequency calculation unit 205 then determines whether the amount of electricity $E_{BUS}$ is equal to or larger than the amount of electricity $E_{st3}$ (Step S112). If the amount of electricity $E_{BUS}$ is equal to or larger than the amount of electricity $E_{st3}$ (YES at Step S112), the frequency calculation unit 205 calculates the frequency F by setting the maximum value $F_{Updt}$ to the frequency F (Step S113). By contrast, if the amount of electricity $E_{BUS}$ is smaller than the amount of electricity $E_{st3}$ (NO at Step S112), the frequency calculation unit 205 calculates the frequency F by Equation (5) described above (Step S114).

By contrast, if the amount of electricity $E_{BUS}$ is equal to or larger than the amount of electricity $E_{st1}$ (YES at Step S106), the determination unit 204 determines the navigation engine 3f to be the navigation engine that generates the navigation information to be displayed on the display device 3p of the mobile terminal 3, and sets "0" to the flag (Step S115). Subsequently, the frequency calculation unit 205 calculates the amount of electricity $E_{st4}$ (Step S116). The frequency calculation unit 205 then determines whether the amount of electricity $E_{BUS}$ is equal to or larger than the amount of electricity $E_{st4}$ (Step S117). If the amount of electricity $E_{BUS}$ is equal to or larger than the amount of electricity $E_{st4}$ (YES at Step S117), the frequency calculation unit 205 calculates the frequency F by setting the maximum value $F_{Updt}$ to the frequency F (Step S118). By contrast, if the amount of electricity $E_{BUS}$ is smaller than the amount of electricity $E_{st4}$ (NO at Step S117), the frequency calculation unit 205 calculates the frequency F by Equation (7) described above (Step S119).

The control unit 206 acquires the value of the flag (Step S120). The control unit 206 then determines whether the value of the flag is "NULL" (Step S121). If the value of the flag is "NULL" (YES at Step S121), the control unit 206 performs the following processing: the control unit 206 transmits an instruction to turn OFF the power of the GPS signal receiver 3d, the GPS signal processing engine 3e, and the navigation engine 3f of the mobile terminal 3 to the mobile terminal 3 by the Wi-Fi transceiver 2b (Step S122). The control unit 206 then determines whether a connection termination request is received from the mobile terminal 3 (Step S123). If no connection termination request is received (NO at Step S123), the control unit 206 redetermines whether the connection termination request is received at Step S123. By contrast, if the connection termination request is received (YES at Step S123), the control unit 206 performs the following processing: the control unit 206 transmits an instruction to turn ON the power of the GPS signal receiver 3d, the GPS signal processing engine 3e, and the navigation engine 3f of the mobile terminal 3 to the mobile terminal 3 (Step S124), and finishes the processing.

By contrast, if the value of the flag is not "NULL" (NO at Step S121), the control unit 206 determines whether the value of the flag is "1" (Step S125). If the value of the flag is "1" (YES at Step S125), the control unit 206 performs the following processing: the control unit 206 transmits an instruction to turn OFF the power of the GPS signal receiver 3d, the GPS signal processing engine 3e, and the navigation engine 3f of the mobile terminal 3 to the mobile terminal 3 by the Wi-Fi transceiver 2b (Step S126). The control unit 206 then transmits an instruction to generate the navigation information at the frequency F calculated by the frequency calculation unit 205 to the navigation engine 2f (Step S127). Subsequently, the control unit 206 transmits an instruction to display the navigation information generated by the navigation engine 2f at the frequency F to the mobile terminal 3 (Step S128). The control unit 206 then determines whether a connection termination request is received from the mobile terminal 3 (Step S129). If the connection termination request is received (YES at Step S129), the system control goes to Step S124. By contrast, if no connection termination request is received (NO at Step S129), the control unit 206 sets 0 to the value of time T, and starts a timer that counts the time T (Step S130). The control unit 206 then determines whether the time T is equal to or larger than 1/F (Step S131). If the time T is not equal to or larger than 1/F (NO at Step S131), the control unit 206 redetermines whether the time T is equal to or larger than 1/F at Step S131. By contrast, if the time T is equal to or larger than 1/F (YES at Step S131), the control unit 206 acquires the navigation information from the navigation engine 2f (Step S132). The control unit 206 then transmits the navigation information thus acquired to the mobile terminal 3 (Step S133), and the system control returns to Step S130.

By contrast, if the value of the flag is not "1" (NO at Step S125), because the value of the flag is "0", the control unit 206 transmits an instruction to turn OFF the power of the GPS signal receiver 3d, and the GPS signal processing engine 3e to the mobile terminal 3 (Step S134). The control unit 206 then transmits an instruction to generate the navigation information at the frequency F calculated by the frequency calculation unit 205 to the navigation engine 3f (Step S135). The control unit 206 then determines whether a connection termination request is received from the mobile terminal 3 (Step S136). If the connection termination request is received (YES at Step S136), the control unit 206 performs the following processing: the control unit 206 transmits an instruction to turn ON the power of the GPS signal receiver 3d, and the GPS signal processing engine 3e of the mobile terminal 3 to the mobile terminal 3 (Step S137), and finishes the processing. By contrast, if no connection termination request is received (NO at Step S136), the control unit 206 sets 0 to the value of the time T, and starts the timer that counts the time T (Step S138). The control unit 206 then determines whether the time T is equal to or larger than 1/F (Step S139). If the time T is not equal to or larger than 1/F (NO at Step S139), the control unit 206 redetermines whether the time T is equal to or larger than 1/F at Step S139. By contrast, if the time T is equal to or larger than 1/F (YES at Step S139), the control unit 206 acquires the information used for generating the navigation information, such as the position information, the map information 25, and the traffic information (Step S140). The control unit 206 then transmits the information thus acquired to the mobile terminal 3 (Step S141), and the system control returns to Step S138.

Figure 12:
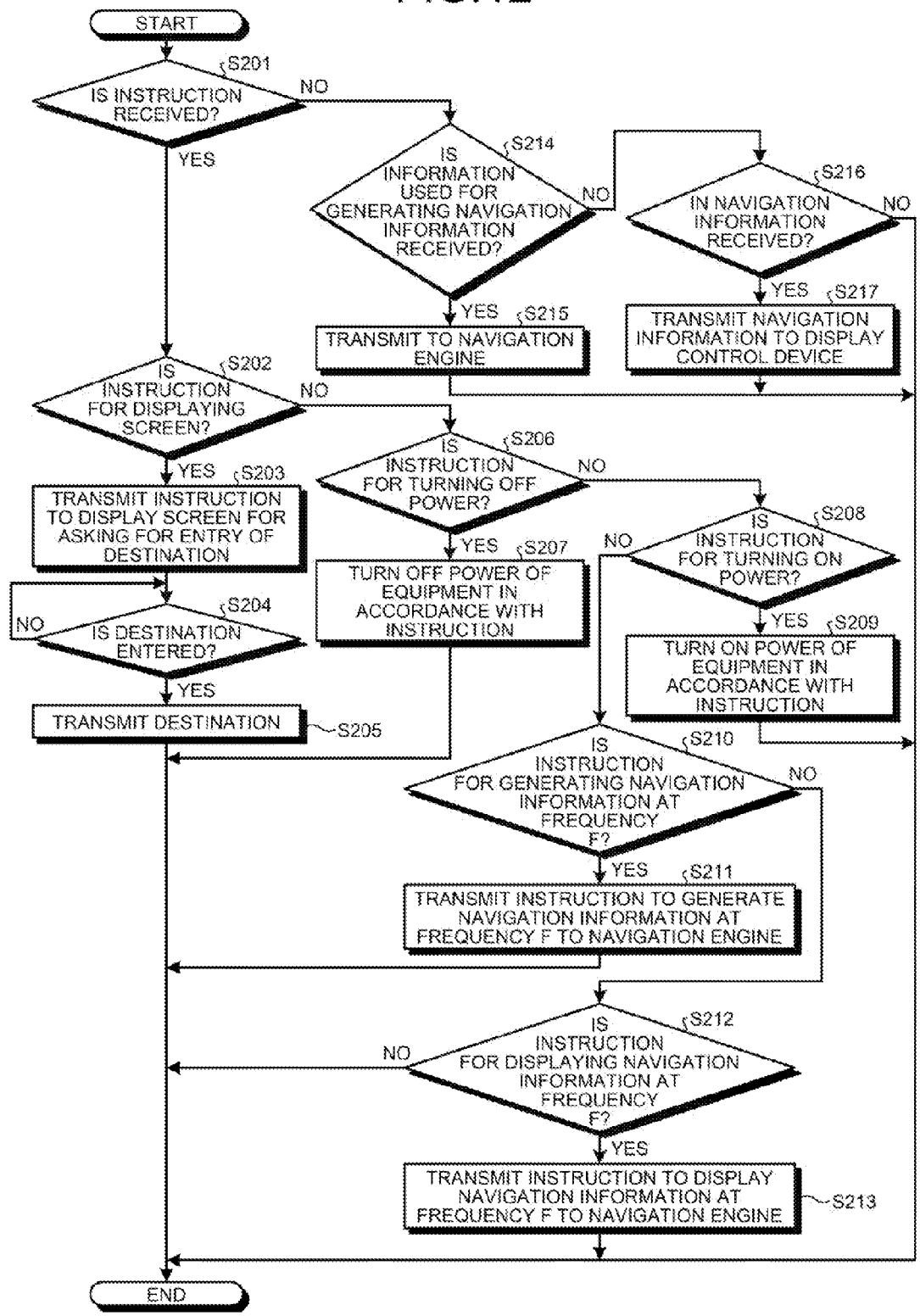
FIG. 12 is a flowchart illustrating a process of second information generation processing according to the first embodiment.

The second information generation processing performed by the processor 3i of the mobile terminal 3 will now be described. FIG. 12 is a flowchart illustrating a process of the second information generation processing according to the first embodiment. Examples of the timing at which the second information generation processing is performed include the timing at which the mobile terminal 3 receives the instruction, the navigation information, and the information used for generating the navigation information described above transmitted from the communication device 2.

As illustrated in FIG. 12, the control unit 303 determines whether the information received from the communication device 2 is an instruction (Step S201). If the information is an instruction (YES at Step S201), the control unit 303 determines whether the instruction thus received is an instruction to display a screen for acquiring the destination from the user (Step S202). If the instruction is the instruction to display the screen for acquiring the destination from the user (YES at Step S202), the control unit 303 transmits an instruction to display a screen for asking for entry of the destination to the display control device 3o (Step S203). The control unit 303 then determines whether the destination is entered by the user (Step S204). If no destination is entered by the user (NO at Step S204), the control unit 303 redetermines whether the destination is entered by the user at Step S204. By contrast, if the destination is entered by the user (YES at Step S204), the control unit 303 transmits the destination thus entered to the communication device 2 (Step S205), and finishes the processing.

By contrast, if the instruction is not the instruction to display the screen for acquiring the destination from the user (NO at Step S202), the control unit 303 determines whether the instruction thus received is an instruction to turn OFF the power of equipment (Step S206). If the instruction is the instruction to turn OFF the power of equipment (YES at Step S206), the control unit 303 turns OFF the power of the equipment in accordance with the instruction (Step S207), and finishes the processing.

If the instruction is not the instruction to turn OFF the power of equipment (NO at Step S206), the control unit 303 determines whether the instruction thus received is an instruction to turn ON the power of equipment (Step S208). If the instruction is the instruction to turn ON the power of equipment (YES at Step S208), the control unit 303 turns ON the power of the equipment in accordance with the instruction (Step S209), and finishes the processing.

If the instruction is not the instruction to turn ON the power of equipment (NO at Step S208), the control unit 303 determines whether the instruction thus received is an instruction to generate the navigation information at the frequency F (Step S210). If the instruction is the instruction to generate the navigation information at the frequency F (YES at Step S210), the control unit 303 transmits the instruction to generate the navigation information at the frequency F to the navigation engine 3f (Step S211), and finishes the processing.

If the instruction is not the instruction to generate the navigation information at the frequency F (NO at Step S210), the control unit 303 determines whether the instruction thus received is an instruction to display the navigation information at the frequency F (Step S212). If the instruction is the instruction to display the navigation information at the frequency F (YES at Step S212), the control unit 303 transmits the instruction to display the navigation information at the frequency F to the display control device 3o (Step S213), and finishes the processing. Furthermore, if the instruction is not the instruction to display the navigation information at the frequency F (NO at Step S212), the control unit 303 also finishes the processing.

By contrast, if the information is not an instruction (NO at Step S201), the control unit 303 determines whether the information received from the communication device 2 is the information used for generating the navigation information (Step S214). If the information is the information used for generating the navigation information (YES at Step S214), the control unit 303 transmits the information used for generating the navigation information thus received, such as the position information, the map information, and the traffic information, to the navigation engine 3f (Step S215), and finishes the processing.

If the information is not the information used for generating the navigation information (NO at Step S214), the control unit 303 determines whether the information received from the communication device 2 is the navigation information (Step S216). If the information received from the communication device 2 is the navigation information (YES at Step S216), the control unit 303 transmits the navigation information to the display control device 3o (Step S217), and finishes the processing. Furthermore, if the information is not the navigation information (NO at Step S216), the control unit 303 also finishes the processing.

A detail of Internet communications via the communication device 2 will be described with reference to FIG. 13. A detail of a telephone conversation via the communication device 2 will be described with reference to FIG. 14 to FIG. 16.

Internet Communications Performed by the Mobile Terminal 3

First, with reference to FIG. 13, an explanation will be made of the detail of the Internet communications via the communication device 2 performed by the mobile terminal 3 that establishes the Wi-Fi communications with the communication device 2 as indicated at Step S714 in FIG. 10. In other words, the detail of the Internet communications between the on-board point 92 and the off-board point 93 illustrated in FIG. 1 will be described.

Figure 13:
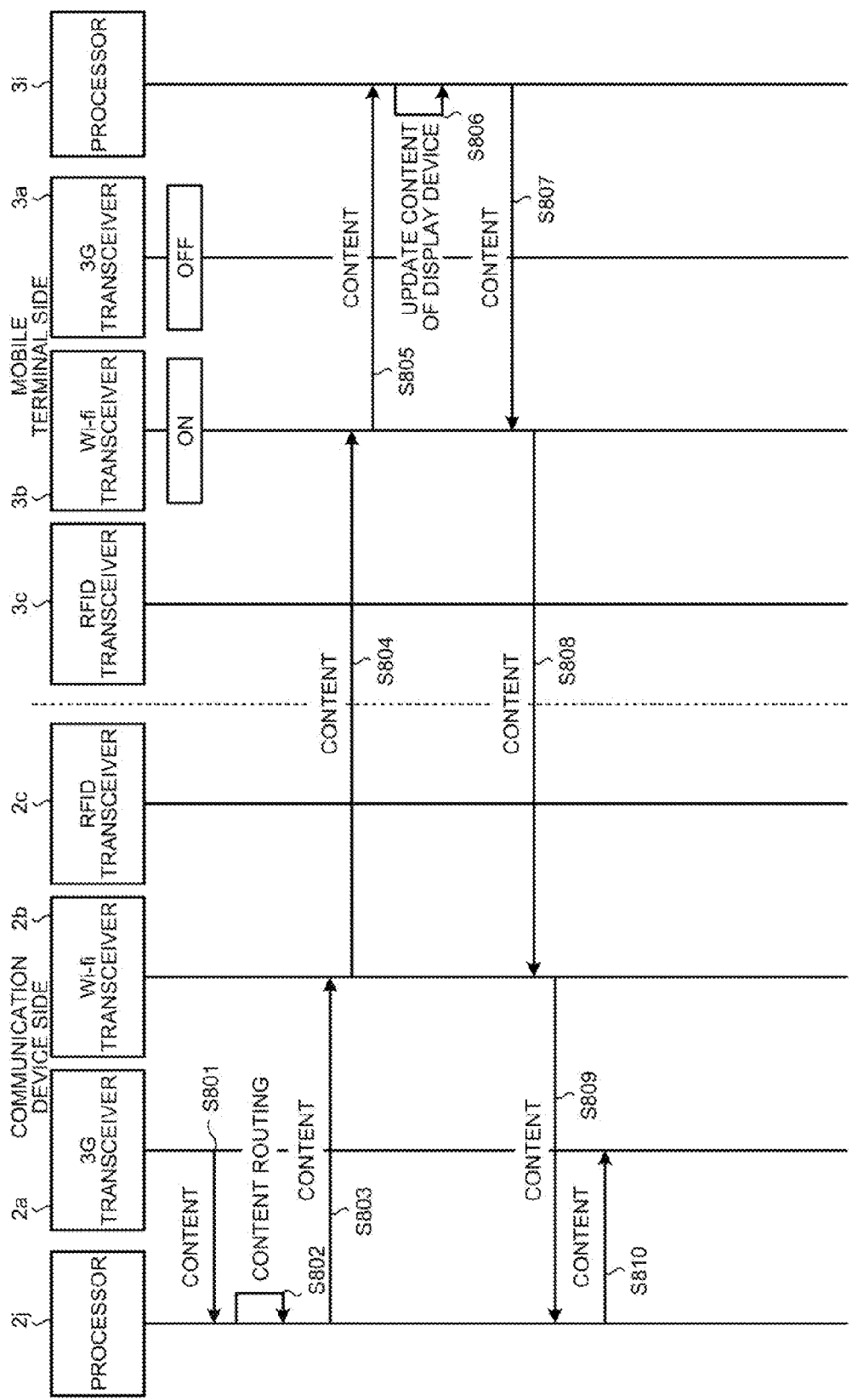
FIG. 13 is a sequence diagram illustrating a detail of Internet communications performed by the mobile terminal.

FIG. 13 is a sequence diagram illustrating the detail of the Internet communications performed by the mobile terminal. FIG. 13 illustrates an example in which the communication device 2 receives a content whose source is the server 5a from the base station 4a by the 3G transceiver 2a. With reference to FIG. 13, transfer of the content to the mobile terminal 3 performed by the communication device 2 will be described. Furthermore, transmission of a content whose destination is the server 5a to the base station 4a via the communication device 2 performed by the mobile terminal 3 will be described with reference to FIG. 13.

In other words, with reference to FIG. 13, the Internet communications between the mobile terminal 3 and the server 5a via the Wi-Fi transceiver 3b of the mobile terminal 3, the Wi-Fi transceiver 2b and the 3G transceiver 2a of the communication device 2, the base station 4a, the 3G network 4, and the Internet 5 will be described.

As illustrated in FIG. 13, the 3G transceiver 2a that has received a content whose source is the server 5a from the base station 4a transfers the content to the processor 2j of the communication device 2 (Step S801). The processor 2j of the communication device 2 then performs routing on the content thus transferred (Step S802). Examples of the routing include referring to the first table 22 to assign the IP address allocated to the mobile terminal 3 to the content as the destination IP address of the content thus received.

The processor 2j of the communication device 2 then transfers the content on which the routing is performed to the Wi-Fi transceiver 2b (Step S803). The Wi-Fi transceiver 2b that has received the content transmits the content to the Wi-Fi transceiver 3b of the mobile terminal 3 (Step S804). Thus, the communication device 2 relays the content whose source is the server 5a, and transmits the content to the mobile terminal 3.

The Wi-Fi transceiver 3b of the mobile terminal 3 then transfers the content thus received to the processor 3i of the mobile terminal 3 (Step S805). Subsequently, the processor 3i of the mobile terminal 3 transmits an instruction to update a display content of the display device 3p based on the content thus transferred to the display control device 3o (Step S806). An assumption is made that the user of the mobile terminal 3 operates the mobile terminal 3 so as to transmit a content whose destination is the server 5a based on the content of the display device 3p thus updated.

Based on the operation performed by the user, the processor 3i of the mobile terminal 3 transmits the content to the Wi-Fi transceiver 3b (Step S807). The Wi-Fi transceiver 3b that has received the content transmits the content thus received to the Wi-Fi transceiver 2b of the communication device 2 (Step S808). Thus, the mobile terminal 3 transmits the content whose destination is the server 5a to the communication device 2.

The Wi-Fi transceiver 2b of the communication device 2 then transfers the content to the processor 2j of the communication device 2 (Step S809). The processor 2j of the communication device 2 to which the content has been transferred transfers the content to the 3G transceiver 2a (Step S810). The 3G transceiver 2a then transmits the content to the base station 4a. Thus, the content transmitted to the base station 4a is transmitted to the server 5a.

As described above, the communication device 2 and the mobile terminal 3 are connected via the Wi-Fi transceivers 2b and 3b thereof, respectively. Furthermore, the communication device 2 can communicate with the server 5a via the base station 4a by the 3G transceiver 2a. Therefore, the communication device 2 can relay the Internet communications between the mobile terminal 3 and the server 5a. This allows the mobile terminal 3 to perform the Internet communications even if the 3G transceiver 3a is set incapable of communicating. Furthermore, the mobile terminal 3 sets the 3G transceiver 3a to be incapable of communicating not to perform the handover to the 3G network 4, thereby reducing the power consumption.

Calling from a Mobile Terminal 4b Outside of the Moving Object 80 to the Mobile Terminal 3 being Connected to the Communication Device 2 in the Wi-Fi Communications A telephone conversation performed by the mobile terminal 3 being connected to the communication device 2 in the Wi-Fi communications will be described with reference to FIG. 14 to FIG. 16. In other words, the detail of the telephone conversation between the on-board point 92 and the off-board point 93 illustrated in FIG. 1 will be described. In a specific example, the communication device 2 is caused to relay transmission and reception of an incoming notification or a calling request, or transmission and reception of a content of the telephone conversation between the mobile terminal 3 and the mobile terminal 4b outside of the moving object 80.

The content of the telephone conversation between the communication device 2 and the mobile terminal 3 is transmitted, for example, by a voice over Internet protocol (VoIP) technology. Voice data of the content of the telephone conversation is converted into packets, for example, and the communication device 2 and the mobile terminal 3 transmit and receive the packets, whereby the content of the telephone conversation is transmitted and received. Causing the communication device 2 to relay the incoming notification, the calling request, or the content of the telephone conversation in this manner allows the mobile terminal 3 to communicate with the mobile terminal 4b while the 3G transceiver 3a is being set incapable of communicating.

Figure 14:
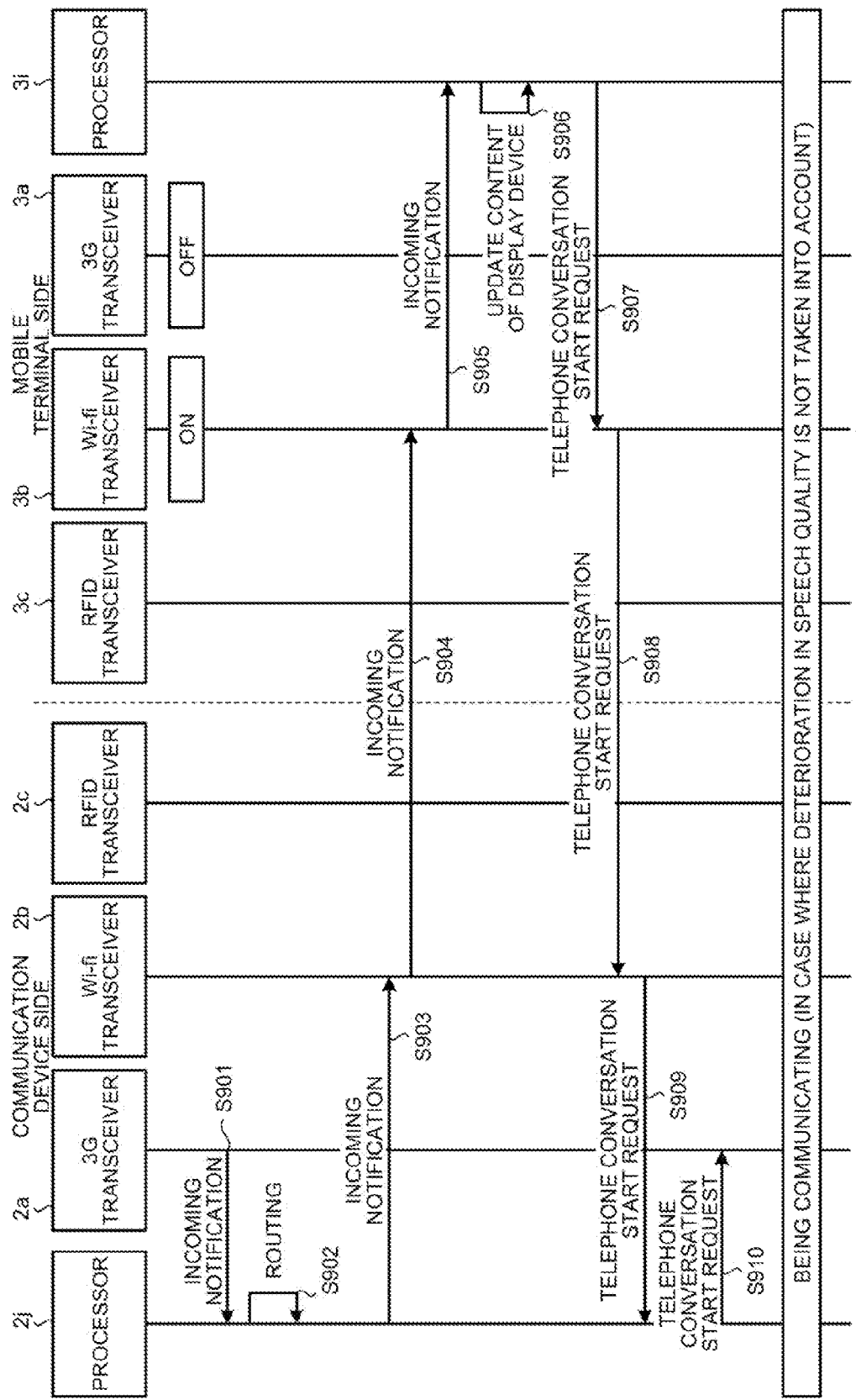
FIG. 14 is a sequence diagram illustrating a detail of calling from a mobile terminal outside of a moving object to the mobile terminal being connected to the communication device in the Wi-Fi communications.
Figure 15:
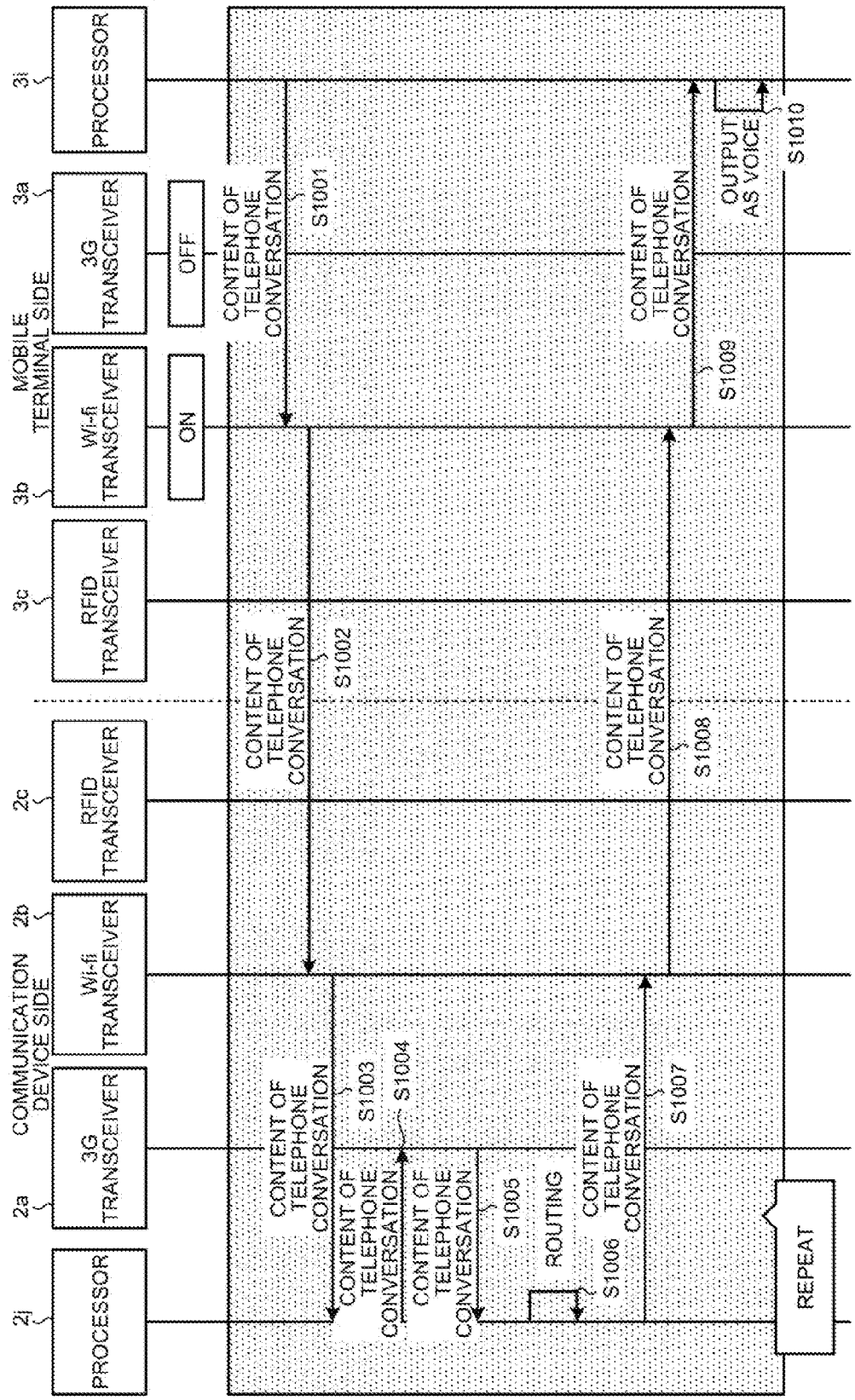
FIG. 15 is a sequence diagram illustrating a detail of a telephone conversation performed by the mobile terminal that has started the telephone conversation with the mobile terminal.
Figure 16:
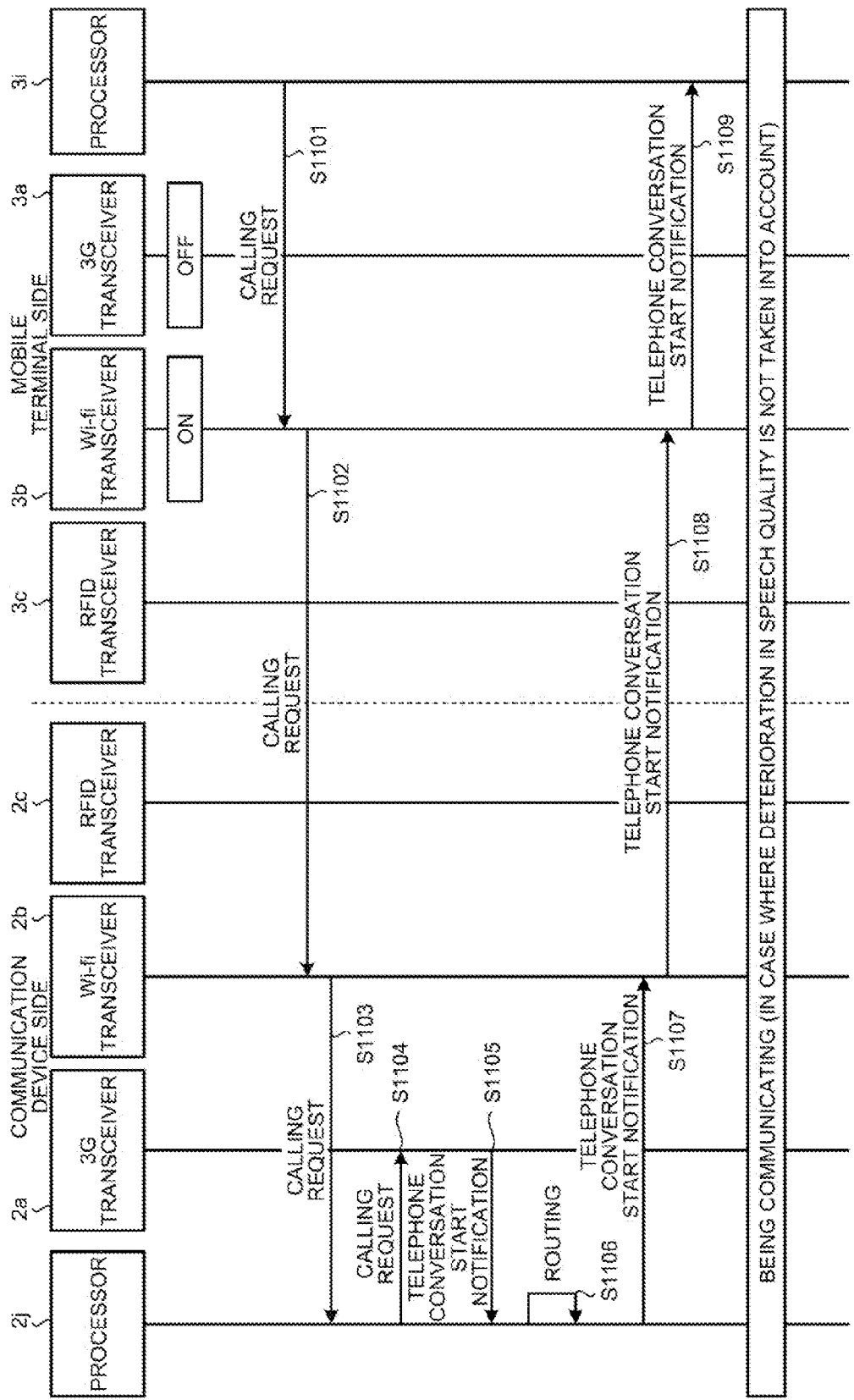
FIG. 16 is a sequence diagram illustrating a detail of calling performed by the mobile terminal being connected to the communication device in the Wi-Fi communications to the mobile terminal outside of the moving object.

In other words, in FIG. 14 to FIG. 16, the mobile terminal 3 and the mobile terminal 4b perform the telephone conversation through a route via the Wi-Fi transceiver 3b of the mobile terminal 3, the Wi-Fi transceiver 2b and the 3G transceiver 2a of the communication device 2, the base station 4a, and the 3G network 4. An explanation will be made of an example in which the mobile terminal 4b outside of the moving object 80 calls to the mobile terminal 3 being connected to the communication device 2 in the Wi-Fi communications with reference to FIG. 14 first.

FIG. 14 is a sequence diagram illustrating a detail of calling from the mobile terminal outside of the moving object to the mobile terminal being connected to the communication device in the Wi-Fi communications. At this time, the 3G transceiver 3a of the mobile terminal 3 is set incapable of communicating. As a result, calling from the mobile terminal 4b outside of the moving object 80 to the mobile terminal 3 causes the virtual terminal 3v in the communication device 2 to receive the incoming notification from the mobile terminal 4b outside of the moving object 80 by the 3G transceiver 2a. The incoming notification includes a phone number of a caller.

As illustrated in FIG. 14, when receiving the incoming notification from the mobile terminal 4b, the 3G transceiver 2a of the communication device 2 transfers the incoming notification to the processor 2j of the communication device 2 (Step S901). The processor 2j of the communication device 2 then performs routing on the incoming notification thus transferred (Step S902).

Subsequently, the processor 2j of the communication device 2 transfers the incoming notification on which the routing is performed to the Wi-Fi transceiver 2b (Step S903). The Wi-Fi transceiver 2b that has received the incoming notification transmits the incoming notification to the Wi-Fi transceiver 3b of the mobile terminal 3 (Step S904).

The Wi-Fi transceiver 3b of the mobile terminal 3 transfers the incoming notification thus received to the processor 3i of the mobile terminal 3 (Step S905). The processor 3i of the mobile terminal 3 then transmits an instruction to update the display content of the display device 3p based on the incoming notification thus transferred to the display control device 3o (Step S906).

Based on an operation performed by the user, the processor 3i of the mobile terminal 3 transmits a telephone conversation start request to the Wi-Fi transceiver 3b (Step S907). The Wi-Fi transceiver 3b that has received the telephone conversation start request transmits the telephone conversation start request thus received to the Wi-Fi transceiver 2b of the communication device 2 (Step S908).

The Wi-Fi transceiver 2b of the communication device 2 then transfers the telephone conversation start request to the processor 2j of the communication device 2 (Step S909). The processor 2j of the communication device 2 to which the telephone conversation start request has been transferred transfers the telephone conversation start request to the 3G transceiver 2a (Step S910). Thus, the mobile terminal 3 and the mobile terminal 4b can start the telephone conversation. The detail of the telephone conversation performed by the mobile terminal 3 that has started the telephone conversation with the mobile terminal 4b will be described with reference to FIG. 15.

FIG. 15 is a sequence diagram illustrating the detail of the telephone conversation performed by the mobile terminal that has started the telephone conversation with the mobile terminal. As illustrated in FIG. 15, the processor 3i of the mobile terminal 3 transfers a content of the telephone conversation to the Wi-Fi transceiver 3b (Step S1001). Subsequently, the Wi-Fi transceiver 3b of the mobile terminal 3 that has received the content of the telephone conversation transmits the content of the telephone conversation to the Wi-Fi transceiver 2b of the communication device 2 (Step S1002).

The Wi-Fi transceiver 2b of the communication device 2 that has received the content of the telephone conversation then transfers the content of the telephone conversation to the processor 2j of the communication device 2 (Step S1003). The processor 2j of the communication device 2 then transfers the content of the telephone conversation to the 3G transceiver 2a (Step S1004). The 3G transceiver 2a that has received the content of the telephone conversation transmits the content of the telephone conversation to the mobile terminal 4b, and transmits a content of the telephone conversation returned from the mobile terminal 4b to the processor 2j (Step S1005).

The processor 2j of the communication device 2 then performs routing on the content of the telephone conversation thus received (Step S1006). Subsequently, the processor 2j of the communication device 2 transfers the content of the telephone conversation on which the routing is performed to the Wi-Fi transceiver 2b (Step S1007). The Wi-Fi transceiver 2b of the communication device 2 then transmits the content of the telephone conversation to the Wi-Fi transceiver 3b of the mobile terminal 3 (Step S1008).

The Wi-Fi transceiver 3b of the mobile terminal 3 that has received the content of the telephone conversation then transmits the content of the telephone conversation to the processor 3i (Step S1009). The processor 3i of the mobile terminal 3 that has received the content of the telephone conversation outputs the content of the telephone conversation as a voice using the user interface 3j (Step S1010). Repeating the processing allows the mobile terminal 3 and the mobile terminal 4b to perform the telephone conversation.

This allows the mobile terminal 3 to perform the telephone conversation while the 3G transceiver 3a is being set incapable of communicating, thereby making it possible to reduce the power consumption. An explanation will be made of an example in which the mobile terminal 3 being connected to the communication device 2 in the Wi-Fi communications calls to the mobile terminal 4b outside of the moving object 80 with reference to FIG. 16.

Calling performed by the mobile terminal 3 being connected to the communication device 2 in the Wi-Fi communications to the mobile terminal 4b outside of the moving object 80.

FIG. 16 is a sequence diagram illustrating a detail of calling performed by the mobile terminal being connected to the communication device in the Wi-Fi communications to the mobile terminal outside of the moving object. At this time, the 3G transceiver 3a of the mobile terminal 3 is set incapable of communicating. As a result, the mobile terminal 3 does not call directly to the mobile terminal 4b via the base station 4a by the 3G transceiver 3a, but calls the mobile terminal 4b via the communication device 2. An example in which the user of the mobile terminal 3 performs an operation to call to the mobile terminal 4b outside of the moving object 80 will be described.

As illustrated in FIG. 16, the processor 3i of the mobile terminal 3 transfers a calling request to the Wi-Fi transceiver 3b (Step S1101). The Wi-Fi transceiver 3b of the mobile terminal 3 that has received the calling request transmits the calling request to the Wi-Fi transceiver 2b of the communication device 2 (Step S1102).

The Wi-Fi transceiver 2b that has received the calling request then transfers the calling request to the processor 2j of the communication device 2 (Step S1103). The processor 2j of the communication device 2 then transfers the calling request to the 3G transceiver 2a (Step S1104). The 3G transceiver 2a that has received the calling request transmits a telephone conversation start notification to the processor 2j (Step S1105).

Subsequently, the processor 2j of the communication device 2 performs routing on the telephone conversation start notification thus received (Step S1106). The processor 2j of the communication device 2 then transfers the telephone conversation start notification on which the routing is performed to the Wi-Fi transceiver 2b (Step S1107). The Wi-Fi transceiver 2b of the communication device 2 then transmits the telephone conversation start notification to the Wi-Fi transceiver 3b of the mobile terminal 3 (Step S1108).

The Wi-Fi transceiver 3b of the mobile terminal 3 that has received the telephone conversation start notification then transmits the telephone conversation start notification to the processor 3i (Step S1109). Thus, the mobile terminal 3 and the mobile terminal 4b start the telephone conversation. Specifically, repeating the processing illustrated in FIG. 15 allows the mobile terminal 3 and the mobile terminal 4b to perform the telephone conversation.

Connection Termination Between the Communication Device 2 and the Mobile Terminal 3 in the Wi-Fi Communications Connection termination between the communication device 2 and the mobile terminal 3 in the Wi-Fi communications will be described with reference to FIG. 17 and FIG. 18. An example in which, when the user of the mobile terminal 3 gets off the moving object 80 at the off-board point 93 illustrated in FIG. 1, the mobile terminal 3 transmits a connection termination request to the communication device 2 will be described to explain the connection termination in the Wi-Fi communications.

Figure 17:
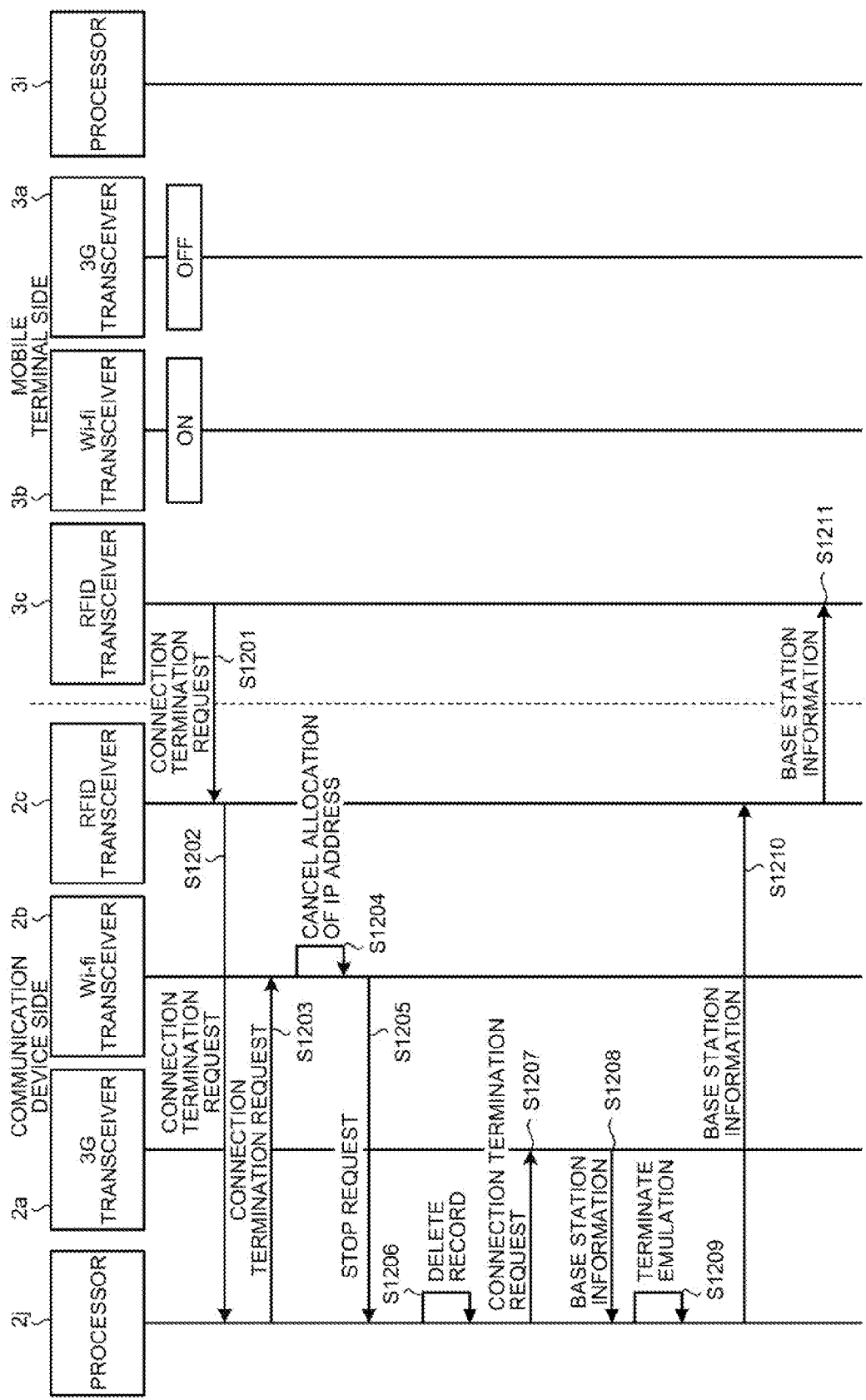
FIG. 17 is a sequence diagram illustrating a detail of connection termination between the communication device and the mobile terminal in the Wi-Fi communications.

FIG. 17 is a sequence diagram illustrating a detail of the connection termination between the communication device and the mobile terminal in the Wi-Fi communications. As illustrated in FIG. 17, the RFID transceiver 3c of the mobile terminal 3 transmits a connection termination request to the RFID transceiver 2c of the communication device 2 (Step S1201). The connection termination request, for example, is a request for requesting the communication device 2 to transmit the base station information, and to delete the virtual terminal 3v. The connection termination request includes the MAC address and the SIM number of the mobile terminal 3.

The processor 2j of the communication device 2 receives the connection termination request transmitted from the RFID transceiver 2c (Step S1202). The processor 2j of the communication device 2 then transfers the MAC address in the connection termination request to the Wi-Fi transceiver 2b (Step S1203). The Wi-Fi transceiver 2b that has received the MAC address cancels the IP address allocated to the MAC address thus received (Step S1204). The Wi-Fi transceiver 2b then transfers a stop request for deleting the record corresponding to the MAC address received from the first table 22 to the processor 2j of the communication device 2 (Step S1205).

When receiving the stop request, the processor 2j of the communication device 2 deletes the record corresponding to the MAC address from the first table 22 (Step S1206). The processor 2j of the communication device 2 then transfers the connection termination request to the 3G transceiver 2a (Step S1207). The 3G transceiver 2a that has received the connection termination request transmits the base station information for identifying the optimum base station 4a to the processor 2j (Step S1208). The optimum base station 4a is the base station 4a (base station 4a having the highest communication quality) having the highest radio field intensity received by the 3G transceiver 2a among a plurality of base stations 4a of the 3G network 4.

The processor 2j of the communication device 2 then deletes the virtual terminal 3v to terminate the emulation (Step S1209). Furthermore, the processor 2j of the communication device 2 transmits the base station information thus received to the RFID transceiver 2c (Step S1210). The RFID transceiver 2c of the communication device 2 then transmits the base station information to the RFID transceiver 3c of the mobile terminal 3 (Step S1211). Subsequently, the system control goes to Step S1301 in FIG. 18.

Figure 18:
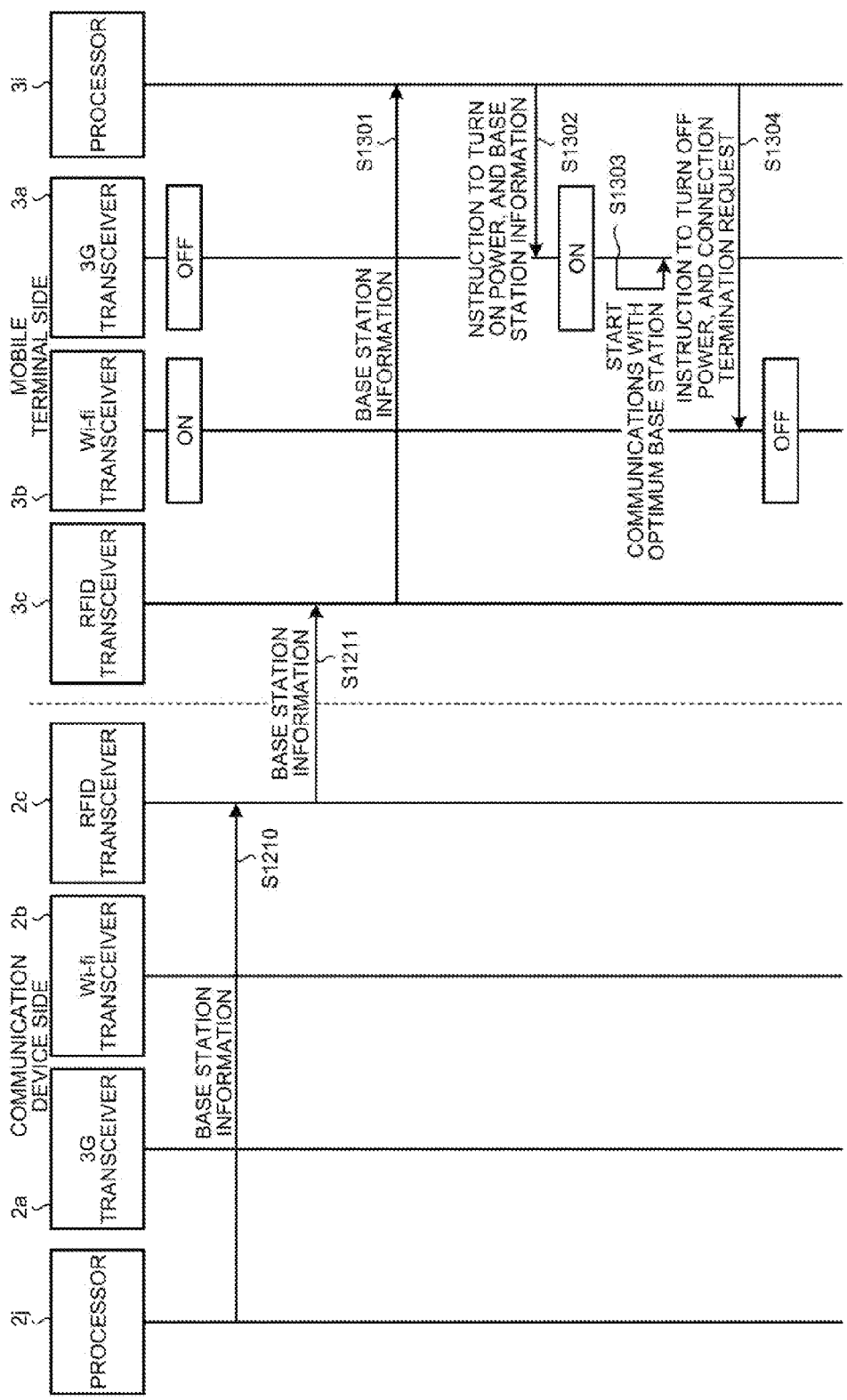
FIG. 18 is another sequence diagram illustrating a detail of the connection termination between the communication device and the mobile terminal in the Wi-Fi communications.

FIG. 18 is another sequence diagram illustrating the detail of the connection termination between the communication device and the mobile terminal in the Wi-Fi communications. As illustrated in FIG. 18, the RFID transceiver 3c of the mobile terminal 3 that has received the base station information transmits the base station information to the processor 3i (Step S1301). The processor 3i of the mobile terminal 3 then transmits an instruction to turn ON the power of the 3G transceiver 3a to the power supply control unit 3l, and transfers the base station information to the 3G transceiver 3a (Step S1302).

Subsequently, the 3G transceiver 3a of the mobile terminal 3 starts communications with the optimum base station 4a identified by the base station information (Step S1303). The processor 3i of the mobile terminal 3 then transmits an instruction to turn OFF the power of the Wi-Fi transceiver 3b to the power supply control unit 3l, and transmits the connection termination request to the Wi-Fi transceiver 3b (Step S1304).

This allows the communication device 2 to transmit the base station information in response to the request from the mobile terminal 3. Therefore, the mobile terminal 3 can be connected to the optimum base station 4a in the 3G network 4. Furthermore, the communication device 2 deletes the virtual terminal 3v corresponding to the mobile terminal 3, thereby making it possible to prevent interference with the mobile terminal 3 from occurring.

Telephone Conversation Performed by the Mobile Terminal 3 when the Speech Quality is to be Improved A telephone conversation performed by the mobile terminal 3 when the speech quality is to be improved will be described with reference to FIG. 19 to FIG. 22. In order to improve the speech quality, the mobile terminal 3 terminates the connection to the communication device 2 in the Wi-Fi communications, and performs a telephone conversation with the mobile terminal 4b outside of the moving object 80 by the local 3G transceiver 3a. In other words, the mobile terminal 3 and the mobile terminal 4b perform the telephone conversation through a route via the 3G transceiver 3a of the mobile terminal 3, the base station 4a, and the 3G network 4.

First, an explanation will be made of an example in which the mobile terminal 4b outside of the moving object 80 calls to the mobile terminal 3 being connected to the communication device 2 in the Wi-Fi communications with reference to FIG. 19 and FIG. 20.

Figure 19:
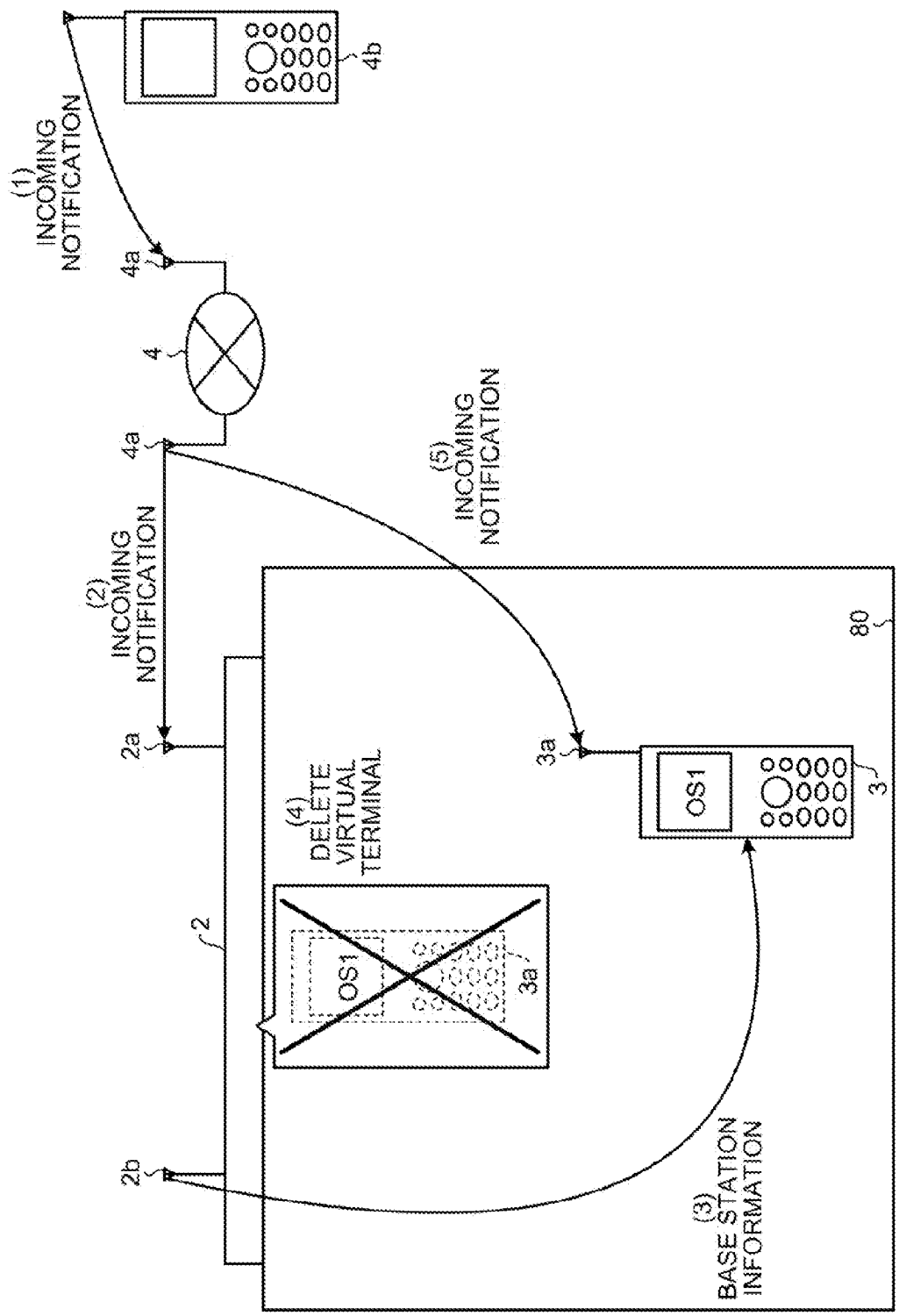
FIG. 19 is a schematic for explaining a specific example of calling from the mobile terminal outside of the moving object to the mobile terminal when the speech quality is to be improved.

Specific Example of Calling from the Mobile Terminal 4b Outside of the Moving Object 80 to the Mobile Terminal 3 when the Speech Quality is to be Improved FIG. 19 is a schematic for explaining a specific example of calling from the mobile terminal outside of the moving object to the mobile terminal when the speech quality is to be improved. FIG. 19 illustrates a state in which the Wi-Fi communications between the communication device 2 and the mobile terminal 3 are established, and the virtual terminal 3v is generated in the communication device 2.

When the mobile terminal 4b outside of the moving object 80 sends an incoming notification to the mobile terminal 3, the mobile terminal 4b outside of the moving object 80 transmits the incoming notification to the base station 4a (1). The incoming notification is transmitted from the base station 4a in the vicinity of the moving object 80 via the 3G network 4. At this time, because the 3G transceiver 3a of the mobile terminal 3 is set incapable of communicating, the incoming notification is transmitted to the virtual terminal 3v in the communication device 2 (2).

When receiving the incoming notification, the communication device 2 transmits the base station information to the mobile terminal 3 (3), and deletes the virtual terminal 3v (4). Subsequently, the connection between the communication device 2 and the mobile terminal 3 in the Wi-Fi communications is terminated. This allows the mobile terminal 3 to connect to the 3G network 4 by itself and to perform the telephone conversation. In addition, it is possible to prevent interference with the mobile terminal 3 from occurring.

The mobile terminal 3 that has received the base station information sets the 3G transceiver 3a to be capable of communicating, connects to the 3G network 4 by itself, and receives the incoming notification from the base station 4a to start the telephone conversation (5). Thus, the mobile terminal 3 can receive the call. Subsequently, the mobile terminal 3 connects to the 3G network 4 by itself to perform the telephone conversation. This allows the mobile terminal 3 to connect to the 3G network 4 via the base station 4a by the local 3G transceiver 3a, thereby making it possible to perform a telephone conversation with high speech quality with the mobile terminal 4b.

After the telephone conversation is finished, the mobile terminal 3 may request the communication device 2 to generate the virtual terminal 3v, or set the 3G transceiver 3a of the mobile terminal 3 to be incapable of communicating again. This causes the communication device 2 to perform the handover to the 3G network 4 instead of the mobile terminal 3 again, thereby reducing the power consumption of the mobile terminal 3.

Figure 20:
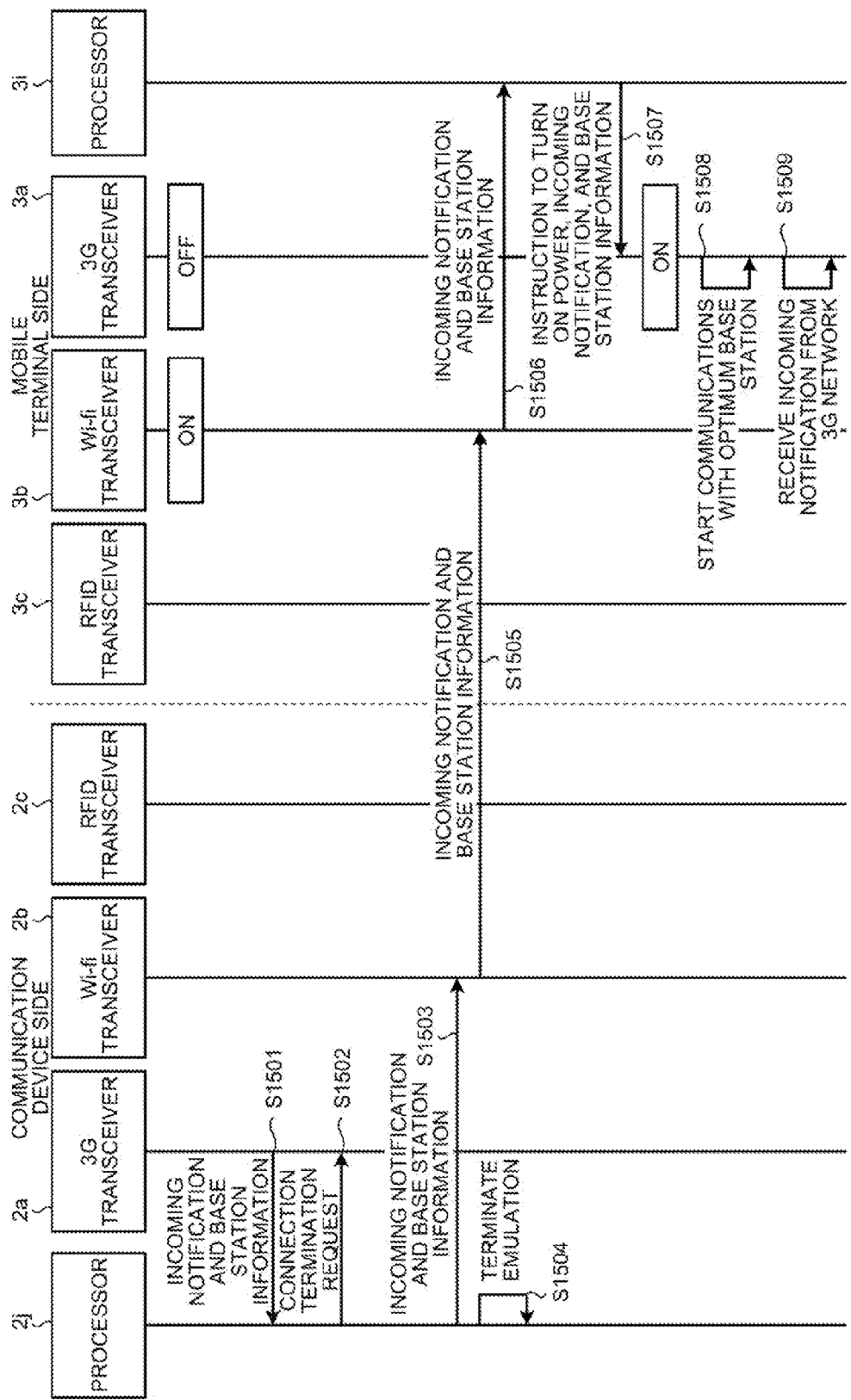
FIG. 20 is a sequence diagram illustrating a detail of the calling from the mobile terminal outside of the moving object to the mobile terminal when the speech quality is to be improved in FIG. 19.

Detail of the Calling from the Mobile Terminal 4b Outside of the Moving Object 80 to the Mobile Terminal 3 when the Speech Quality is to be Improved FIG. 20 is a sequence diagram illustrating a detail of the calling from the mobile terminal outside of the moving object to the mobile terminal when the speech quality is to be improved in FIG. 19. At this time, the 3G transceiver 3a of the mobile terminal 3 is set incapable of communicating. As a result, calling from the mobile terminal 4b outside of the moving object 80 to the mobile terminal 3 causes the virtual terminal 3v in the communication device 2 to receive the incoming notification from the mobile terminal 4b outside of the moving object 80 by the 3G transceiver 2a. The incoming notification includes a phone number of a caller.

As described in FIG. 20, when receiving the incoming notification from the mobile terminal 4b, the 3G transceiver 2a of the communication device 2 transfers the incoming notification and the base station information of the optimum base station 4a to the processor 2j of the communication device 2 (Step S1501).

The processor 2j of the communication device 2 transfers a connection termination request to the 3G transceiver 2a (Step S1502). The processor 2j of the communication device 2 then transfers the incoming notification and the base station information to the Wi-Fi transceiver 2b (Step S1503).

The processor 2j of the communication device 2 then deletes the virtual terminal 3v to terminate the emulation of the mobile terminal 3 (Step S1504). The Wi-Fi transceiver 2b that has received the incoming notification and the base station information thus transferred transmits the incoming notification and the base station information to the Wi-Fi transceiver 3b of the mobile terminal 3 (Step S1505).

The Wi-Fi transceiver 3b of the mobile terminal 3 that has received the incoming notification and the base station information transfers the incoming notification and the base station information to the processor 3i of the mobile terminal 3 (Step S1506). The processor 3i of the mobile terminal 3 then transmits an instruction to turn ON the power of the 3G transceiver 3a to the power supply control unit 3l, and transfers the incoming notification and the base station information thus transferred to the 3G transceiver 3a (Step S1507), thereby activating the 3G transceiver 3a.

Subsequently, the 3G transceiver 3a starts communications with the optimum base station 4a identified by the base station information (Step S1508). The 3G transceiver 3a then receives the incoming notification directly from the 3G network 4 to start the telephone conversation (Step S1509). This allows the mobile terminal 3 to connect to the 3G network 4 via the base station 4a by the local 3G transceiver 3a, thereby making it possible to perform a telephone conversation with high speech quality with the mobile terminal 4b. The mobile terminal 3 may maintain the connection to the Wi-Fi communications, and use the connection only for accessing the Internet.

A telephone conversation performed by the mobile terminal 3 when the mobile terminal 3 being connected to the communication device 2 in the Wi-Fi communications calls to the mobile terminal 4b outside of the moving object 80 will be described with reference to FIG. 21 and FIG. 22.

Figure 21:
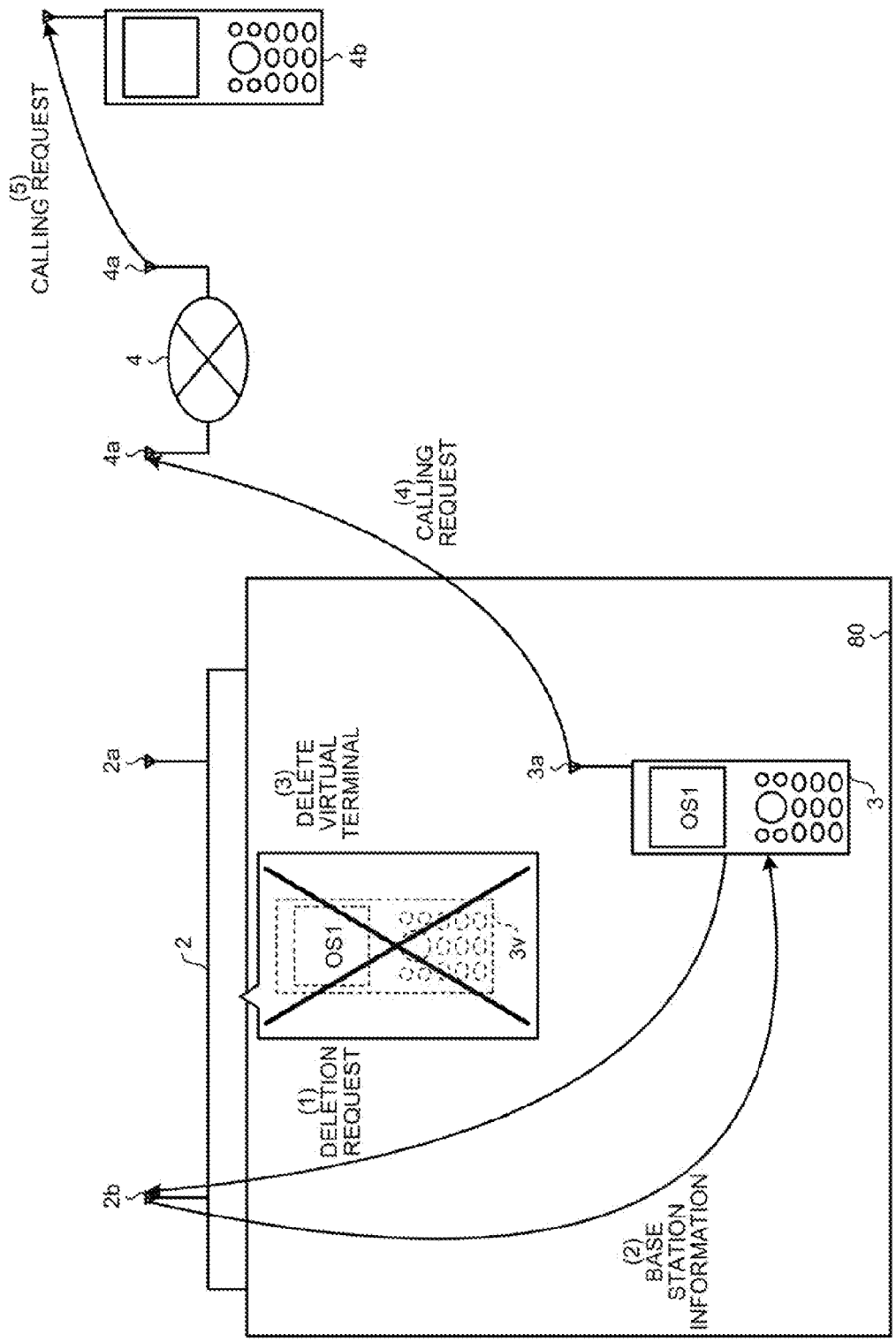
FIG. 21 is a schematic for explaining a specific example of calling performed by the mobile terminal to the mobile terminal outside of the moving object when the speech quality is to be improved.

Specific Example of Calling from the Mobile Terminal 3 to the Mobile Terminal 4b Outside of the Moving Object 80 when the Speech Quality is to be Improved FIG. 21 is a schematic for explaining a specific example of calling performed by the mobile terminal to the mobile terminal outside of the moving object when the speech quality is to be improved. FIG. 21 illustrates a state in which the Wi-Fi communications between the communication device 2 and the mobile terminal 3 are established, and the virtual terminal 3v is generated in the communication device 2.

An assumption is made that the user of the mobile terminal 3 performs an operation to call to the mobile terminal 4b outside of the moving object 80. If the mobile terminal 3 sends a calling request to the mobile terminal 4b outside of the moving object 80 based on the operation performed by the user, the mobile terminal 3 transmits a stop request of the virtual terminal 3v to the communication device 2 (1).

The communication device 2 that has received the stop request transmits the base station information to the mobile terminal 3 (2), and deletes the virtual terminal 3v (3). Subsequently, the connection between the communication device 2 and the mobile terminal 3 in the Wi-Fi communications is terminated. This allows the mobile terminal 3 to connect to the 3G network 4 by itself and to perform the telephone conversation. In addition, it is possible to prevent interference with the mobile terminal 3 from occurring.

The mobile terminal 3 that has received the base station information sets the 3G transceiver 3a to be capable of communicating, connects to the 3G network 4 by itself, and transmits the calling request to the base station 4a (4). The calling request is transmitted to the mobile terminal 4b outside of the moving object 80 via the 3G network 4 (5). Thus, the mobile terminal 3 can perform the calling. Subsequently, the mobile terminal 3 connects to the 3G network 4 by itself to perform the telephone conversation. This allows the mobile terminal 3 to connect to the 3G network 4 via the base station 4a by the local 3G transceiver 3a, thereby making it possible to perform a telephone conversation with high speech quality with the mobile terminal 4b.

After the telephone conversation is finished, the mobile terminal 3 may request the communication device 2 to generate the virtual terminal 3v, and set the 3G transceiver 3a of the mobile terminal 3 to be incapable of communicating again. This causes the communication device 2 to perform the handover to the 3G network 4 instead of the mobile terminal 3 again, thereby reducing the power consumption of the mobile terminal 3.

Figure 22:
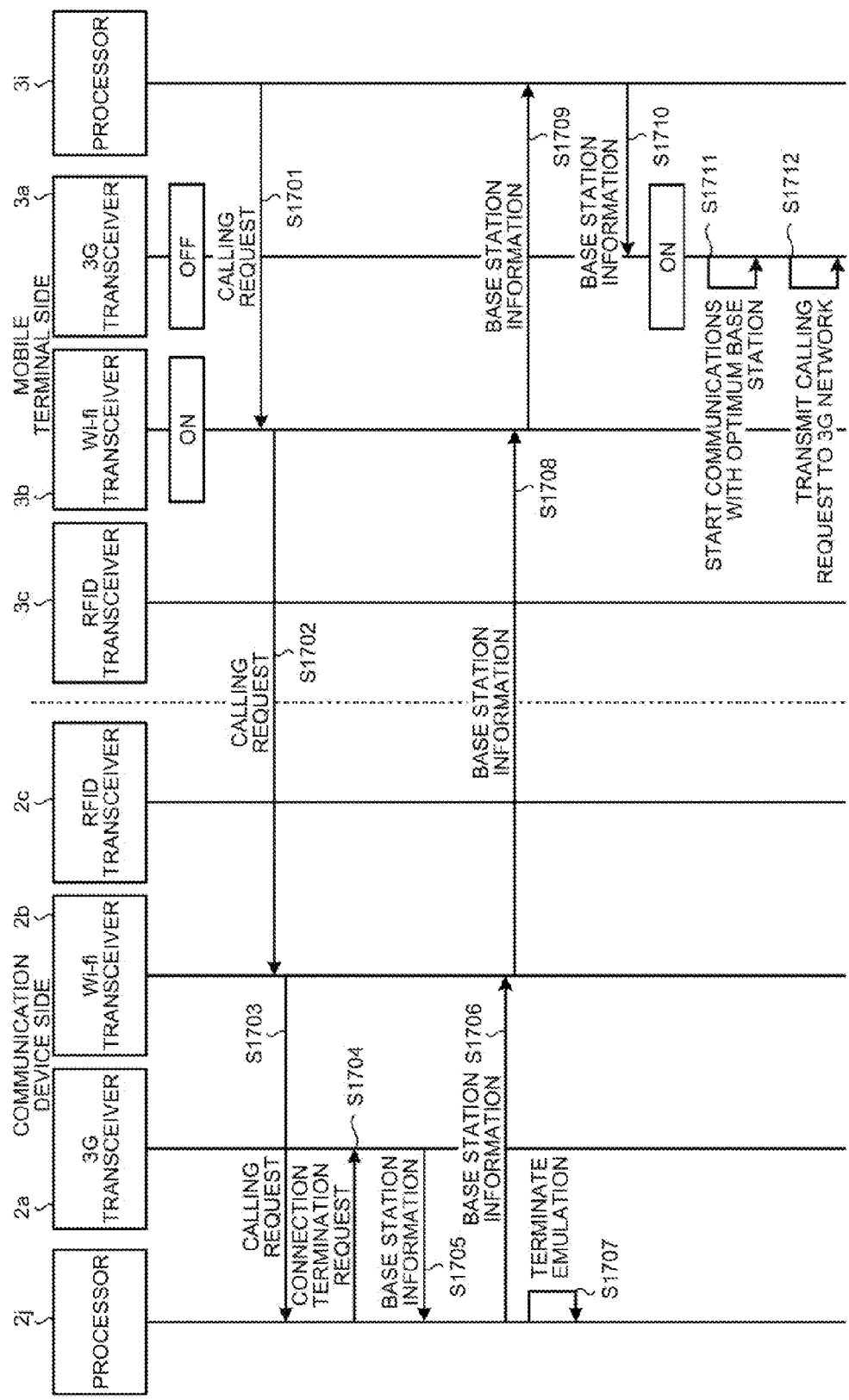
FIG. 22 is a sequence diagram illustrating a detail of the calling performed by the mobile terminal to the mobile terminal outside of the moving object when the speech quality is to be improved in FIG. 21.

Detail of the Calling Performed by the Mobile Terminal 3 to the Mobile Terminal 4b Outside of the Moving Object 80 when the Speech Quality is to be Improved FIG. 22 is a sequence diagram illustrating a detail of the calling performed by the mobile terminal to the mobile terminal outside of the moving object when the speech quality is to be improved in FIG. 21. An assumption is made that the user of the mobile terminal 3 performs an operation to call to the mobile terminal 4b outside of the moving object 80.

As illustrated in FIG. 22, based on the operation performed by the user, the processor 3i of the mobile terminal 3 transfers a calling request to the Wi-Fi transceiver 3b (Step S1701). The Wi-Fi transceiver 3b of the mobile terminal 3 that has received the calling request transmits the calling request to the Wi-Fi transceiver 2b of the communication device 2 (Step S1702). The calling request, for example, is a request for requesting the communication device 2 to transmit the base station information, and to delete the virtual terminal 3v.

The Wi-Fi transceiver 2b that has received the calling request then transfers the calling request to the processor 2j of the communication device 2 (Step S1703). Subsequently, the processor 2j of the communication device 2 transfers a connection termination request to the 3G transceiver 2a (Step S1704). The 3G transceiver 2a that has received the connection termination request transmits the base station information for identifying the optimum base station 4a to the processor 2j (Step S1705).

The processor 2j of the communication device 2 then transmits the base station information thus received to the Wi-Fi transceiver 2b (Step S1706). Furthermore, the processor 2j of the communication device 2 deletes the virtual terminal 3v to terminate the emulation (Step S1707). Subsequently, the Wi-Fi transceiver 2b of the communication device 2 transmits the base station information to the Wi-Fi transceiver 3b of the mobile terminal 3 (Step S1708).

The Wi-Fi transceiver 3b of the mobile terminal 3 that has received the base station information then transmits the base station information to the processor 3i (Step S1709). The processor 3i of the mobile terminal 3 then transmits an instruction to turn ON the power of the 3G transceiver 3a to the power supply control unit 3l, and transfers the base station information to the 3G transceiver 3a (Step S1710).

Subsequently, the 3G transceiver 3a of the mobile terminal 3 starts communications with the optimum base station 4a identified by the base station information (Step S1711). The 3G transceiver 3a then transmits a calling request directly to the 3G network 4 to start the telephone conversation (Step S1712). This allows the mobile terminal 3 to connect to the 3G network 4 via the base station 4a by the local 3G transceiver 3a, and to perform a telephone conversation with high speech quality with the mobile terminal 4b. The mobile terminal 3 may maintain the connection to the Wi-Fi communications, and use the connection only for accessing the Internet.

As described above, the communication device 2 according to the present embodiment includes the Wi-Fi transceiver 2b that communicates with the Wi-Fi transceiver 3b of another device different from the communication device 2 itself. The communication device 2 calculates the amount of electricity $E_{BUS}$ available in the mobile terminal 3 while the Wi-Fi transceiver 3b and the Wi-Fi transceiver 2b are in a state capable of communicating with each other. If $E_{BUS}$ is smaller than the predetermined amount, the communication device 2 determines the navigation engine 2f to be the generation unit that generates the navigation information to be output by the mobile terminal 3. If the navigation engine 2f is determined to be the generation unit, the communication device 2 controls the mobile terminal 3 so as to stop supplying power to the navigation engine 3f, and to output the navigation information generated by the navigation engine 2f. Accordingly, with the communication device 2, the power consumption can be reduced.

Furthermore, the communication device 2 determines the navigation engine 2f to be the generation unit that generates the navigation information to be output by the mobile terminal 3 for a mobile terminal equipped with no navigation engine. Accordingly, with the communication device 2, even a mobile terminal equipped with no navigation engine can use the navigation function.

The communication device 2 calculates the frequency F as high as possible within the range in which the amount of electricity consumed in the mobile terminal 3 does not exceed the amount of electricity available in the battery 3m. In other words, the communication device 2 calculates the frequency F for realizing a high-quality navigation function within the range in which the amount of electricity consumed does not exceed the amount of electricity available. Accordingly, with the communication device 2, a navigation function with appropriate accuracy can be realized in accordance with the state of the battery 3m.

If the amount of electricity $E_{BUS}$ available in the mobile terminal 3 is smaller than the predetermined amount, the mobile terminal 3 according to the present embodiment acquires the navigation information generated in the communication device 2 capable of performing the Wi-Fi communications with the mobile terminal 3 itself. Furthermore, if the amount of electricity $E_{BUS}$ available in the mobile terminal 3 itself is smaller than the predetermined amount, the mobile terminal 3 stops supplying power to the GPS signal receiver 3d, the GPS signal processing engine 3e, and the navigation engine 3f. By contrast, if the amount of electricity $E_{BUS}$ available in the mobile terminal 3 is equal to or larger than the predetermined amount, the mobile terminal 3 acquires the information used for generating the navigation information from the communication device 2 capable of performing the Wi-Fi communications with the mobile terminal 3 itself, and controls the navigation engine 3f so as to generate the navigation information based on the information thus acquired. In addition, if the amount of electricity $E_{BUS}$ available in the mobile terminal 3 is equal to or larger than the predetermined amount, the mobile terminal 3 stops supplying power to the GPS signal receiver 3d, and the GPS signal processing engine 3e. Accordingly, with the mobile terminal 3, the power consumption can be reduced.

In the above description, the embodiment related to the disclosed device is explained. However, the present invention can be applied to various different embodiments in addition to the present embodiment. Other embodiments included in the present invention will be described below.

When the user gets off the moving object 80 at the offboard point 93, for example, the mobile terminal 3 may acquire the position information generated by the GPS signal processing engine 2e of the communication device 2, use the position information thus acquired to generate the navigation information, and restart the navigation function. As a result, the amount of electricity consumed for initialization in the GPS signal processing engine 3e or the like can be reduced.

Even in the case where the navigation engine 3f of the mobile terminal 3 is determined to be the navigation engine that generates the navigation information to be output by the mobile terminal 3, if the navigation engine 3f is not used for predetermined time or more, the following processing may be performed: the navigation engine that generates the navigation information to be output by the mobile terminal 3 may be changed to the navigation engine 2f of the communication device 2. As a result, the amount of electricity consumed can be reduced in accordance with the stats of use of the navigation function of the mobile terminal 3.

Furthermore, even if the navigation engine 2f is determined to be the navigation engine that generates the navigation information to be output by the mobile terminal 3, the navigation engine that generates the navigation information to be output by the mobile terminal 3 may be changed to the navigation engine 3f in accordance with an instruction from the user. As a result, if the accuracy of the navigation function of the mobile terminal 3 is higher than the accuracy of the navigation function of the communication device 2, the accuracy of the navigation function can be enhanced, thereby improving the quality of the service.

If the time $T_{BUS}$ is updated to be a new value because of a change in the traffic conditions and other factors, the system 1 may update each value of $E_{BUS}$, $E_{st1}$, $E_{st2}$, $E_{st3}$, $E_{st4}$, F, and the like calculated as described above, and may use the values thus updated to control generation of the navigation information. As a result, the generation of the navigation information can be controlled in accordance with the traffic conditions and other factors.

In the processing explained in the first embodiment, all or a part of the processing explained as processing performed automatically may be performed manually. Furthermore, in the processing explained in the present embodiment, all or a part of the processing explained as processing performed manually may be performed automatically by a known method.

Depending on various types of loads and usage, the processing at each of the steps of each processing explained in the embodiments may be divided into small pieces arbitrarily or integrated. Furthermore, any of the steps may be omitted.

Depending on various types of loads and usage, the order of the processing at each of the steps of each processing explained in the embodiments may be changed.

The components of the devices are illustrated as a functional concept, and are not necessarily configured physically in the manner illustrated. In other words, specific aspects of distribution and integration of the devices are not limited to the illustrated configuration, and may be configured by distributing or integrating all or a part thereof by arbitral units functionally or physically depending on various types of loads and usage. For example, the information acquisition unit 302 and the control unit 303 may be integrated to be a control unit.

[b] Second Embodiment

Information Generation Program

Figure 23:
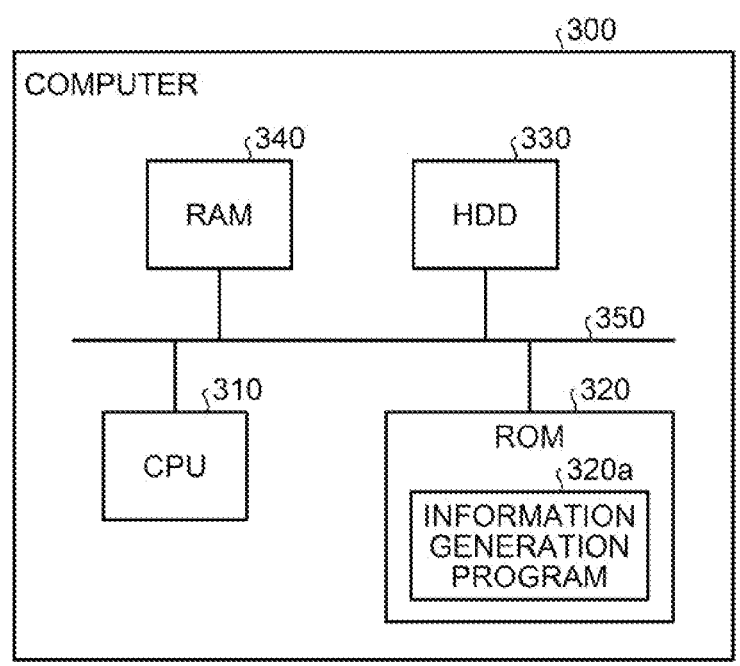
FIG. 23 is a diagram of a computer that executes the communication program.

The processing of the communication device 2 and the processing of the mobile terminal 3 explained in the embodiment may be realized by executing a computer program prepared in advance by a computer system, such as a personal computer and a work station. An explanation will be made of an example of a computer that executes an information generation program having the same functions as those of the communication device 2 or the mobile terminal 3 explained in the embodiment with reference to FIG. 23. FIG. 23 is a diagram of the computer that executes the information generation program.

As illustrated in FIG. 23, a computer 300 according to a second embodiment includes a central processing unit (CPU) 310, a read-only memory (ROM) 320, a hard disk drive (HDD) 330, and a random access memory (RAM) 340. These components 300 to 340 are connected via a bus 350.

In the ROM 320, an information generation program 320a that realizes the same functions as those of the electricity amount calculation unit 202, the information acquisition unit 203, the determination unit 204, the frequency calculation unit 205, and the control unit 206 according to the first embodiment is stored in advance. The information generation program 320a may be separated arbitrarily. The information generation program 320a may be a computer program that realizes the same functions as those of the information acquisition unit 302, and the control unit 303 according to the first embodiment.

The CPU 310 reads the information generation program 320a from the ROM 320 to execute the information generation program 320a.

The HDD 330 is provided with a first table, a database, a second table, and map information. The first table, the database, the second table, and the map information correspond to the first table 22, the database 23, the second table 24, and the map information 25 according to the first embodiment, respectively.

The CPU 310 reads the first table, the database, the second table, and the map information to store them in the RAM 340. Furthermore, the CPU 310 uses the first table, the database, the second table, and the map information stored in the RAM 340 to execute the information generation program 320a. All data stored in the RAM 340 are not necessarily stored therein, and data used for processing may be stored in the RAM 340.

The information generation program described above is not necessarily stored in the ROM 320 in advance.

For example, the information generation program is stored in a "portable physical medium", such as a flexible disk (FD), a compact disk read-only memory (CD-ROM), a digital versatile disk (DVD), a magneto-optical disk, and an integrated circuit (IC) card, to be inserted into the computer 300. The computer 300 may read the information generation program from such a physical medium to execute the information generation program.

Furthermore, the information generation program is stored in an "another computer (or a server)" connected to the computer 300 via a public line, the Internet, a local area network (LAN), a wide area network (WAN), or the like. The computer 300 may read the information generation program from such a computer or a server to execute the information generation program.

According to an aspect of the communication device, the mobile terminal, the medium, the information generation method, and the system, it is possible to reduce the power consumption.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:
1. An information generation system comprising:
a first device comprising:
  a first memory; and
  a first processor coupled to the first memory, wherein the first processor executes a process comprising:
    calculating an amount of electricity available in a second device different from the first device while the first device and the second device are in a state capable of communicating with each other based on an amount of electricity available in the second device transmitted from the second device;
    acquiring information used to generate navigation information;
    when the amount of electricity calculated is smaller than a predetermined amount, determining a first generation unit that generates the navigation information based on the information acquired to be a generation unit that generates navigation information to be output by the second device; and
    when the first generation unit is determined, transmitting an instruction to stop supplying power to a generation unit of the second device and an instruction to output the navigation information generated by the first generation unit to the second device; and
the second device comprising:
  a second memory; and
  a second processor coupled to the second memory, wherein the second processor executes a process comprising:
    transmitting an amount of electricity available to the first device;
    acquiring information used to generate navigation information;
    receiving the instructions; and
    performing control to stop supplying power to a second generation unit that generates the navigation information based on the information acquired and to output the navigation information generated by the first generation unit based on the instructions received.

* * * * *